INVENTOR.
GERSHON MECKLER
BY
Owen + Owen
ATTORNEYS

INVENTOR.
GERSHON MECKLER

INVENTOR.
GERSHON MECKLER
BY
Owen + Owen
ATTORNEYS

INVENTOR.
GERSHON MECKLER
BY
ATTORNEYS

INVENTOR.
GERSHON MECKLER
BY
Owen & Owen
ATT'YS.

3,403,723
**DYNAMICALLY INTEGRATED COMFORT
CONDITIONING SYSTEM**
Gershon Meckler, Atlanta, Ga., assignor to Lithonia
Lighting, Inc., Conyers, Ga., a corporation of
Georgia
Continuation-in-part of application Ser. No. 192,629,
May 7, 1962. This application Aug. 10, 1965, Ser.
No. 478,702
39 Claims. (Cl. 165—19)

This application is a continuation in part of my pending application, Ser. No. 192,629, filed May 7, 1962, now abandoned, and also my pending application Ser. No. 140,416, filed Sept. 21, 1961, now abandoned.

This invention relates generally to comfort conditioning systems and, more particularly, to such systems which include energy transfer devices which are effective to absorb energy from radiant energy generators within a building which encloses a space to be conditioned, and transferring means for absorbing energy from the devices at a temperature level higher than is conventional in present systems.

The systems are split "air-water" systems which permit integration of lighting components such as a water-cooled radiant lighting troffer and/or radiant luminous ceiling with other building systems. Only minimum ventilation air is supplied to occupancy zones when water tubing is used in place of bulky air ducts and reduced refrigeration tonnage requirements result in smaller air conditioning apparatus and auxiliary equipment. Several typical equipment and piping arrangements illustrate this invention.

Conventional comfort conditioning systems rely upon a flow of conditioned air to accomplish comfort conditioning of an enclosed space. Radiant energy from the sun and from radiant energy generators within a building in which comfort conditioning is to be accomplished, e.g., from lights and from electronic equipment, is absorbed within the space to be conditioned or in adjacent portions of the building within which the space is situated, and is ultimately dissipated as sensible heat by circulated conditioned air. Radiant energy is at a relatively high temperature level, and could be dissipated at a high temperature level. Upon investigation of the breakdown of a typical building space load into its corresponding radiation, convection and moisture load components, it is found that approximately 37 percent of the space load is generated at its source by radiation, 47 percent by convection and 16 percent as moisture.

It is the purpose of this invention to dissipate this radiant energy at high temperature levels economically by utilizing its capacity and concentration together with the great thermal difference between it and a cooling medium, such as recirculated already used cooling fluid and/or cooling tower water which is inexpensive.

When, as is conventional, circulated conditioned air is relied upon to dissipate heat which entered the space as radiant energy, it is impossible to accomplish the dissipation at a high temperature level. As a consequence, according to the second law of thermodynamics, a substantial increase in entropy accompanies the dissipation. Furthermore, refrigeration of one sort or another is required to accomplish the cooling of the circulated conditioned air, while the temperature level of radiant energy is sufficiently high that it can be dissipated at a relatively high temperature, for example that of cooling tower water or of water from an evaporative cooler.

The use of circulated conditioned air to dissipate heat loads imposed by radiant energy on a space to be conditioned is not only thermodynamically unsound because of the excessive increase in entropy, but is also unsound because it requires refrigeration to dissipate energy which is at a sufficiently high level that it could be dissipated with water from a cooling tower or from an evaporative cooler.

The present invention is based upon the discovery of apparatus for comfort conditioning of an enclosed space within a building in which at least one radiant energy generator is situated, and wherein a part of the radiant energy from such generator is absorbed by an energy transfer device and dissipated from such device at a high temperature level.

The principle of redistribution of heat can be applied to many buildings in northern latitudes at sizable savings in initial cost and operating cost. Simultaneous heat losses and gains provide the opportunity of utilizing combinations of equipment staged and zoned in conjunction with atmospheric cooling to provide comfort and utilize internal heat gains as a source for heat to counteract building-heat losses.

It is, therefore, an object of the instant invention to provide improved apparatus for comfort conditioning of a closed space.

It is a further object of the invention to provide such apparatus wherein the entropy increase associated with dissipation of heat which originates as radiant energy is minimized.

It is another object of the invention to provide such apparatus wherein energy generated by a radiant energy generator, within a building in which a comfort conditioned closed space is required, is dissipated at a predetermined high temperature level.

It is a further object of the invention to provide a conditioning system wherein the refrigeration equipment is operated during the winter as a heat pump utilizing the building lighting system as a stable heat source.

Other objects and advantages will be apparent from the description which follows, reference being made to the accompanying drawings in which like numerals refer to like and corresponding parts, wherein.

Figure 1:
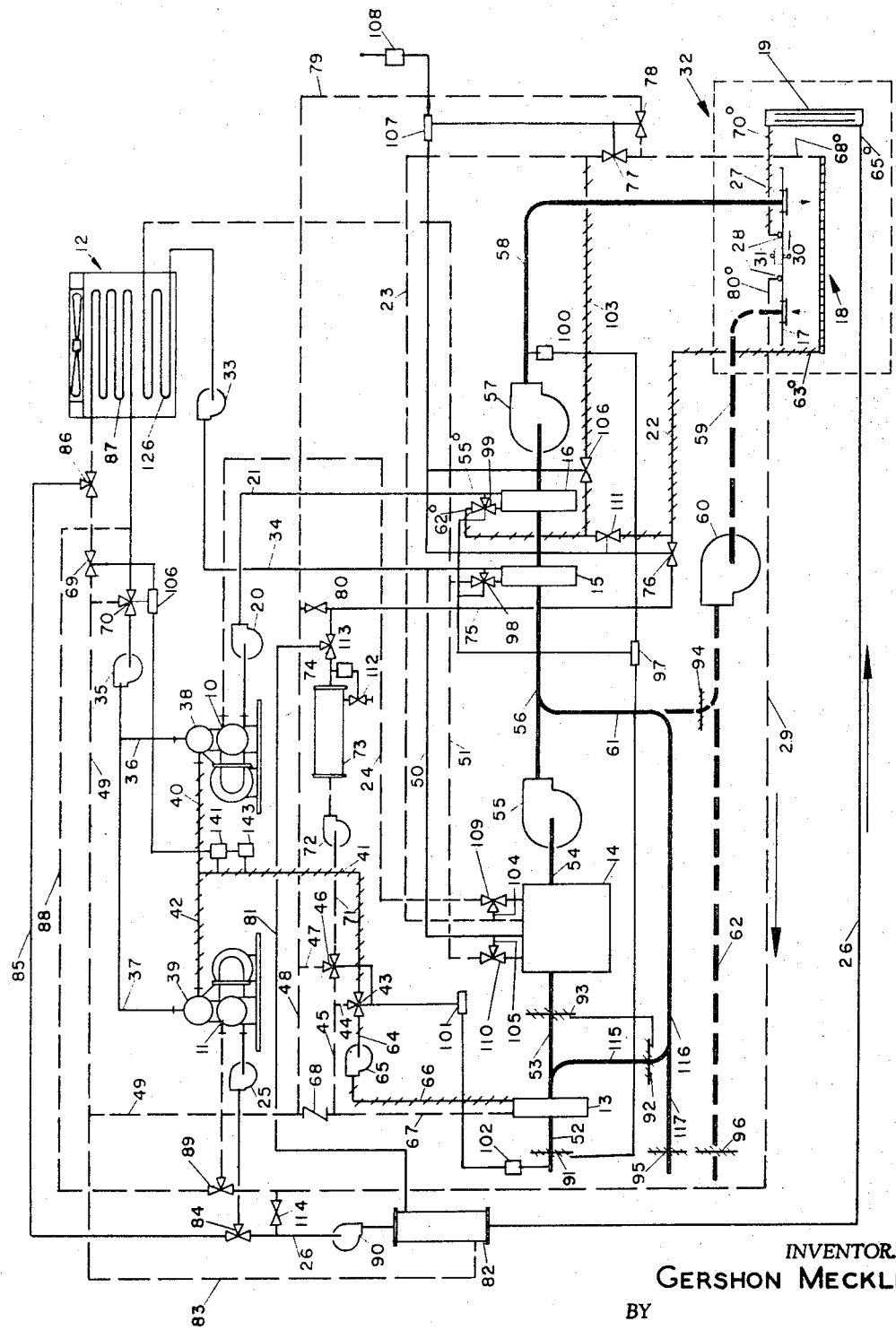
FIG. 1 is a partially schematic flow diagram of apparatus according to the invention.

Referring now to the drawings, and, in particular, to FIG. 1, apparatus according to the invention, in one embodiment, comprises a first water chiller 10, a second water chiller 11, and a closed circuit cooling tower 12, as sources for cooled water as a heat transfer medium. The water chillers 10 and 11 are represented conventionally as of the evaporator-compressor-condenser type. The apparatus also includes a plurality of heat transfer devices to accomplish the required comfort conditioning, namely a preheating coil 13, a chemical humidifier or dehumidifier 14, a first sensible cooling coil 15, a second sensible cooling coil 16, an upper radiant panel 17, a lower radiant panel 18 and a perimeter panel 19.

Chilled water from the first water chiller 10 is circulated by a pump 20 through a line 21 to the second convective coil 16, then through a line 22 to the lower radiant panel 18, through a line 23 to the chemical dehumidifier 14, and from thence through a line 24 back to the first water chiller 10. The line 21 is represented by a solid line to indicate that the chilled water therein is at its minimum temperature; slashes have been provided on the line 22 to indicate that the chilled water therein is at an intermediate temperature; and the lines 23 and 24 are dotted to indicate that the water therein is at a relatively high temperature. This same system of representation has been used in all cases in the drawings hereof to designate relative water temperatures.

Chilled water from the water chiller 11 is circulated by a pump 25 through a line 26 to the panel 19, from thence through a line 27, pipes 28, and a line 29 back to the second chiller 11. The pipes 28 are in thermal contact with the upper radiant panel 17, so that they are effective to absorb radiant energy from a light source 30 and from associated ballast 31, both of which constitute radiant energy generators within the building in which a comfort conditioned space is to be provided. The space is represented schematically in FIG. 1 by a dotted line 32.

Cooled water from the tower 12 is circulated in two separate circuits. A pump 33 delivers cooled water from the tower 12 to a line 34 for circulation in one of the circuits, while a pump 35 delivers cooled water from the tower 12 to lines 36 and 37 for circulation in the second circuit. Cool water from the lines 36 and 37 is delivered condensers 38 and 39 of the first water chiller 10 and the second water chiller 11, respectively, for absorbing heat. Water from the condenser 38 is discharged through a line 40, and mixes in a line 41, with water discharged from the condenser 39 through a line 42. Under summer operating conditions, the intermediate temperature water in the line 41 is circulated through a three-way valve 43, a line 44, a line 45, a three-way valve 46, and lines 47, 48 and 49 back to the cooling tower 12. Cool water from the line 34 is delivered to the first sensible cooling coil 15, and, in parallel therewith, through a line 50 to the chemical dehumitifier 14. Water from the coil 15 and from the dehumidifier 14 enters a line 51 for return to the tower 12.

Preferred conditions of operation of the apparatus of FIG. 1, under summer conditions, are represented, in part, by temperature designations on the drawing. For example, the chiller 10 is preferably operated to deliver chilled water to the second sensible cooling coil 16 at about 55° F., and the rate of flow of chilled water through the coil 16 is controlled so that the water is discharged therefrom at about 62° F. The pump 20 can be adjusted to control the rate of flow to achieve the desired temperature increase in the coil 16; part of the chilled water can be by-passed, as subsequently discussed in more detail, and the amount by-passed can be controlled to maintain the desired temperature rise; or both expedients can be used in combination. As a consequence of heat gains in the line 22, chilled water enters the lower radiant panel 18 at a temperature of about 63° F., and, as a consequence of heat transfer therein, leaves at a temperature of about 68° F. The second water chiller 11 is operated at a higher temperature than is the first chiller 10, so that water at a temperature of about 65° F. is delivered to the perimeter panel 19. Heat exchange within the panel 19 increases the water temperature to about 70° F. and this water is delivered from the line 27 to the pipes 28. The water within the pipes 28 is heated to about 80° F. by heat exchange attributable principally to the absorption by the upper panel 17 of radiant energy from the light source 30 and the associated ballast 31. The 80° F. water is then returned through the line 29 to the second chiller 11.

It will be noted that, in the preferred method of operation described above, the upper radiant panel 17 is effective to absorb radiant energy from a generator disposed within a building in which a comfort conditioned space is required, and that sensible heat which results from the absorption of such radiant energy is transferred to a heat transfer medium, specifically, chilled water, at a predetermined high temperature level, while both the second sensible cooling coil 16 and the lower radiant panel 18 are maintained at temperatures lower than the predetermined high temperature. The perimeter panel 19 is also maintained at a temperature lower than such predetermined temperature, but at least a part of the humidity control unit 14 is maintained at a temperature higher than the predetermined temperature by cooling tower water. Even though chilled water, after it has been circulated through other heat transfer devices, is used in the FIG. 1 embodiment to dissipate sensible heat from the upper radiant panel 17, which heat is a consequence of radiation from the light source 30 and the associated ballast 31, a significant improvement in efficiency is achieved because of the minimization of increase in entropy associated with the heat dissipation. In addition, the need for circulated conditioned air is minimized because a substantial portion of the heat load that is carried by conditioned air in conventional systems is carried by the cooled water portion of the apparatus of FIG. 1. As a consequence, conditioned air sufficient only for ventilation is required in this apparatus, a flow of about 0.6 cubic foot per minute per square foot of floor area in the conditioned space being optimum.

Outside air can be introduced into the space to be conditioned, being admitted through an inlet duct 52, and drawn through the pre-heating coil 13, a duct 53, the chemical humidifier or dehumidifier 14, and a duct 54 by a blower 55, and delivered by the blower 55 to a duct 56, from which it passes through the first and second sensible cooling coils 15 and 16 to a supply blower 57, and through a supply duct 58 to an outlet which is between the upper radiant panel 17 and the lower radiant panel 18. Air is also withdrawn from the space to be conditioned through a return air duct 59 by a blower 60, and recirculated, in whole or in part, through a duct 61 to the duct 56, or vented, in whole or in part, through an exhaust duct 62.

Under conditions of winter day cycle, the water from the condensers 38 and 39, in the line 41, is circulated through the three-way valve 43, a line 64, a pump 65, a line 66, and the preheat coil 13. A line 67 receives water from the preheat coil 13, and may deliver it through a check valve 68 to the line 49. In this instance, however, a valve 69 in the line 49 is closed, so that the water flows through a three-way valve 70 and back to the pump 35 for return through the lines 36 and 37 to the condensers 38 and 39. The three-way valve 46 can also be set so that water from the line 67 is delivered through the line 45, the three-way valve 46, a line 71, and a pump 72, to a converter or heat exchanger 73. Water from the converter 73 is delivered to a three-way valve 74, and from thence may travel through a line 75, a valve 76, the line 22, the lower panel 18, and the line 23 to a valve 77, which is closed under this condition, so that the flow is through an open valve 78, a line 79, to the line 48, and back to the line 49. Water from the valve 74 can also flow through a valve 80 directly to the line 48; in this instance the valve 76 would be closed.

Under conditions of winter night cycle, water circulated by the pump 72, through the converter 73 and the three-way valve 74, flows through a line 81 to a heat exchanger 82, and from thence through a line 83 to the line 49, through the three-way valve 70 and to the pump 35 for return to the condensers 38 and 39. When the outside temperature is sufficiently high, chilled water is circulated by the pump 25 through a three-way valve 84, through a line 85, a three-way valve 86, a cooling tower coil 87, a line 88, and a three-way valve 89 back to chiller 11. Heat absorbed from outside by the water so circulated becomes available in the condenser 39 for redistribution. Water is also circulated through the heat exchanger 82 by a pump 90, and through the line 26, the perimeter panel 19, the line 27, the pipes 28, and the line 29 back to the pump 90. The water so circulated is heated in the exchanger 82 by water from the converter 73, and supplies heat to the space.

It will be appreciated that the apparatus of FIG. 1, under conditions of winter night cycle, assuming that the light source 30 is not energized under conditions of night operation, receives heat only from the converter 73 and by transfer in the coil 87 from outside air. The converter 73, however, is not used to supply heat to chilled water from the chiller 11, so the heat pump action thereof depends upon heat transfer thereto in the coil 87 from outside air. So long as chilled water is the medium circulated, the freezing point thereof imposes a limit upon the minimum temperature at which such heat transfer can be accomplished. The system can be operated as described in climates which are reasonably warm the year around, and the light source 30, and other similar light source within the space or spaces to be conditioned, can be energized under night conditions whenever a period of extreme cold prevents the system from receiving heat from outside, as described.

When the system of FIG. 1 is used in a climate where temperatures below the freezing point of water are frequent during the winter season, it is preferred to employ ethylene glycol or another low freezing liquid instead of water in connection with the chiller 11, i.e., for circulation by the pump 25.

It will be noted that the system of FIG. 1 does not employ the chiller 10 as a heat pump under winter night cycle conditions, as no provision is made for supplying heat to the chilled water output thereof during such operation.

If desired, the system of FIG. 1 can also be operated under conditions of extreme cold without resorting to the use of a low freezing liquid for circulation by the pump 25. Use of the chiller 11 is merely discontinued whenever outside conditions prevent the absorption of heat in the coil 87, and sufficient heat is supplied to the converter 73, in a manner subsequently discussed in more detail, to supply building requirements, and the chiller 11 is not operated. Suitable means (not illustrated), such as a steam coil, can then be used to prevent the freezing of water which may be within the cooling tower 12.

Returning to the air circulation system of the apparatus of FIG. 1, dampers 91, 92, 93, 94, 95 and 96 are provided in various ducts of the circulating system. For summer operation, the dampers 91 and 93 are open so that the minimum outside air required for humidity control and ventilation can enter the system through the ducts 52 and 53, in which these dampers operate. The damper 94, which is in the duct 61, and controls the recirculation of air withdrawn from the space, and the damper 96, which is in the exhaust 62, are modulated to match the amount of air exhausted through the exhaust duct 62 with the amount entering the system through the inlet duct 52. For this condition of operation, the dampers 92 and 95 are both closed to prevent the by-passing of inlet air around the humidifier or dehumidifier 14, or around both the preheat coil 13 and the humidifier or dehumidifier 14, as subsequently discussed in more detail.

As has been indicated above, cool water flow through the sensible coil 16 is modulated to maintain a water outlet temperature of about 62° F. As a consequence of the constancy of the air flow in the duct 58, this can be accomplished by a controller 97, which operates valves 98 and 99 to regulate the by-passing of cool water around the sensible coils 15 and 16, respectively, in response to signals from a temperature sensor 100 in the duct 58.

The valves 43 and 46, for summer operation, are set so that water from the condensers 38 and 39 by-passes both the preheating coil 13 and the converter 73, the flow being through the line 41, the valve 43, the line 44, the line 45, the valve 46, the line 47, the line 48, and the line 49 to the coil 87 of the cooling tower 12. Both of these valves are actuated by a controller 101, which is responsive to a temperature sensor 102. The temperature sensor 102 measures essentially ambient air temperature, being disposed at the inlet end of the duct 52. The actuation of the valves 43 and 46 will subsequently be discussed in more detail in connection with a description of the control of the system under conditions other than summer.

By-pass lines 103, 104 and 105 are also provided for flow of water around the lower radiant panel 18, for by-passing the humidification unit 14 by flow directly from the line 23 to the line 24, and for by-passing the humidity control unit 14 by providing direct flow from the line 50 to the line 51, respectively. A valve 106 is provided in the line 103, and actuated by a controller 107 in response to signals from a device 108 which senses outside temperature. Valves 109 and 110 are provided in the lines 104 and 105, respectively, and modulated in any suitable manner (not illustrated) to maintain a required water discharge temperature in the lines 24 and 51, respectively. A throttling valve 111 is also provided in the line 22, and actuated with the valve 106 by the controller 107 to vary the flow through the panel 18 and through the line 103 as instantaneously required by ambient conditions. The controller 107 also sets the valves 76, 77 and 78 for their respective "winter" and "summer" positions in response, respectively, to signals from the device 108 indicating temperatures below and above a control point. It will be appreciated that several conditioned spaces 32 are zoned relative to one controller 107, and that a large building will include several controllers 107 for different zones.

Winter day operation of the apparatus of FIG. 1 is modified in the manner indicated in the following discussion. The positions of the dampers 91, 92, 93, 94, 95, 96 remain the same. The three-way valve 43 is set, in response to a signal from the temperature sensor 102 indicating that the inlet air temperature is below a predetermined minimum, to direct water from the line 41 into the line 64 for delivery by the pump 65 through the line 66 to the preheating coil 13, and from thence through the line 67, and the line 45, to the three-way valve 46. For winter day operation the valves 69 and 70 are controlled to divert water in the line 49 from the cooling tower 12, and to direct it through the three-way valve 70 for recirculation by the pump 35, and to maintain 120° F. water in the line 41.

The purpose of the preheating coil 13, in winter operation, is to heat cold outside air so that it can be humidified within the unit 14 and delivered to the duct 54 at a temperature within design limits. It will be noted that this heating is accomplished by utilization of what would otherwise be waste heat from the condensers 38 and 39 of the water chillers 10 and 11. Under winter day conditions in a large multi-story building heating is required only in perimeter regions, and cooling is necessary in interior regions. The heating required in perimeter regions is provided through appropriate ones of the lower radiant panels 18 by adjustment of the three-way valve 46 to direct water from the line 45 to the line 71 and the pump 72, and from thence through the heater 73, the three-way valve 74, the line 75 and the valve 76 to the line 22. The valve 80 and the valve 111 in the line 22 are closed, but the latter can be modulated by the controller 107 as in summer operation. The valve 106 in the line 103 is opened so that chilled water from the second sensible cooling coil 16, at least in part, bypasses the lower radiant panel 18, and flows directly into the line 23. However, since cooling of the humidity control unit 14 is not required under conditions of winter day operation, the three-way valve 109 is turned to prevent the flow of water into the unit 14, and thereby to cause bypassing of water from the line 23 through the line 104 into the line 24 and then back to the first water chiller 10. Under extreme conditions, when more heat than is available from the condensers 38 and 39 is required to preheat incoming air and to supply heat to the lower radiant panel 18, steam can be supplied from any suitable source (not illustrated) to the heater 73 through a valve 112, which is controlled by a temperature sensor 113. Mixing of the water from the second sensible cooling coil 16 with water returning from the lower grid 18 is prevented, in such situation, by closing of the valve 77 and opening of the valve 78 so that water from the lower panel 18 is directed through the line 79 to the line 48 for circulation through the line 49, and the three-way valve 70 to the pump 35, and, ultimately, back to the condensers 38 and 39.

The second chilled water circuit, i.e., that from the chiller 11, is reversed, relative to the summer flow, for winter day operation. The reversed flow is through the upper radiant panel 17 and then through the perimeter radiant panel 19. As a consequence, heat from the lights 30 and the associated ballasts 31 is redistributed to the perimeter panel 19.

For winter night operation, the apparatus of FIG. 1 is as indicated in the following discussion. The positions of the dampers 91, 92, 93, 94, 95 and 96 are modified, the damper 94 being open, and all of the other dampers being closed. As a consequence, no fresh, outside air is introduced into the space to be conditioned, but air is withdrawn therefrom by the blower 60 through the exhaust duct 59, and recirculated through the duct 61, the duct 56, the first coil 15, the second coil 16, the blower 57 and the supply duct 58 back to the space. The lights 30 are not energized, so there is no energy released therefrom, or from the ballasts 31.

The chiller 10 and its associated circuit are not operated under winter night conditions. The valves 77 and 111 are closed, but the valve 106 is open. The three-way valve 74 is set to pass water from the converter 73 through the line 81, the heat exchanger 82, the lines 83 and 49, and the three-way valve 70, to the pump 35 for return to the condenser 39. The valve 69 is closed. No heat is lost in the preheat coil 13 because the damper 91 is closed.

The valve 84 is set to direct water from the pump 25 through the line 85, the three-way valve 86, the coil 87, the line 88, and the three-way valve 89 back to the chiller 11. During this operating sequence, the coil 87 becomes the heat source utilized by the heat pump chiller 11, since during night operation the lights are assumed to be off and are no longer an available source for heat for redistribution. This heat is transferred to the circuit containing the perimeter panel 19 by the heat exchanger 82. The circuit containing the perimeter panel 19 consists of the pump 90, which is now operating, the heat exchanger 82, the line 26, the perimeter panel 19, the line 27, the pipes 28, the line 29, and a now open valve 114.

For conditions intermediate winter and summer, the apparatus of FIG. 1 is operated as follows: the valves 43 and 46 remain in the "winter" position to operate the preheat coil 13, and the damper 91 is open to admit the minimum outside air required. The damper 93 is closed, however, so that air from the inlet duct 52 bypasses the humidity control unit 14 through a duct 115 in which the now open damper 92 is positioned and through a by-pass duct 116, from which it is directed into the duct 61. The damper 95 is in a by-pass inlet duct 117, and is modulated with the dampers 94 and 96 to maintain a temperature of 62° F. for the air mixture in the duct 56. The valves 98 and 99 are set for both tower water and chilled water to bypass the sensible cooling coils 15 and 16, respectively.

During intermediate operation, the valve 69 is open and the valve 70 set as in summer operation in order that excess heat from the condensers 38 and 39, not required in the preheating coil 13, can be dissipated in the cooling tower coil 87. The valves 78 and 112 are closed; the valves 77 and 106 are open. The valves 76 and 111 are modulated so that either heating or cooling is done by the lower radiant panel 18, whichever is necessary depending on inside space requirements.

It is to be understood that the humidity control unit 14 can be any available, known unit, for example, one employing a hygroscopic liquid such as a solution of lithium chloride or ethylene glycol, which is circulated over contactors through which chilled water, cooling tower water, or both are circulated. Within the unit 14 the chilled water circuit is completely separate from the cooling tower water circuit, so that there is no intermingling of the two streams of cooling medium. Air from the duct 53 is circulated through the unit 14 in contact with the hygroscopic liquid flowing over the contactors for humidity control. When the unit 14 acts as a dehumidifier, water must be evaporated from the liquid to maintain a substantially constant concentration; when the unit acts as a humidifier, water must be added to the solution therein to maintain the substantially constant concentration. Both of these operations can be accomplished in any suitable known manner.

Figure 2:
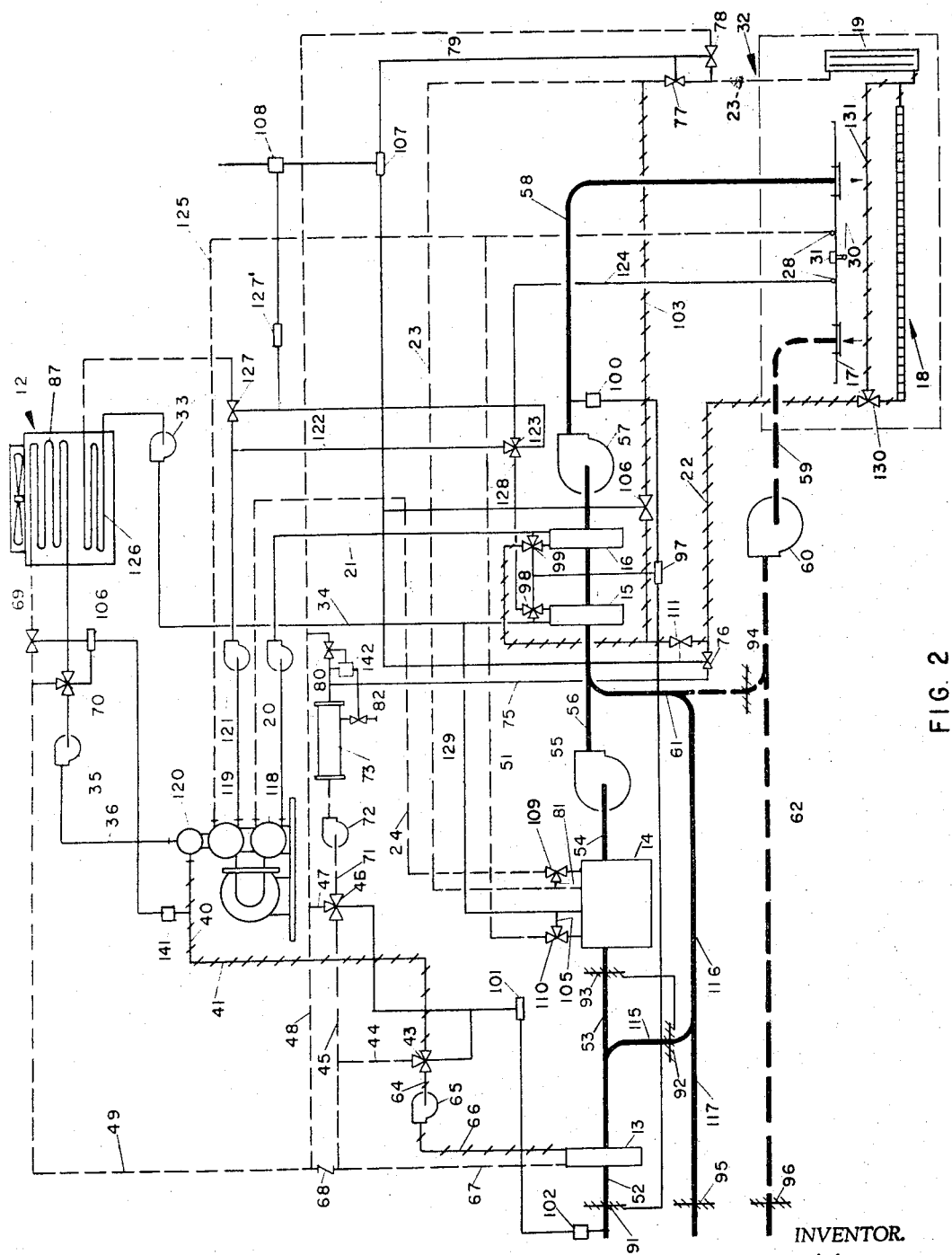
FIG. 2 is a partially schematic flow diagram of modified apparatus according to the invention.

The apparatus of FIGURE 2 is similar to that of FIGURE 1, except that a first water chiller 118 is substituted for the chiller 10, and a second water chiller 119 is substituted for the chiller 11. The chillers 118 and 119 are combined with a common condenser 120 and a common compressor of a conventional type. The apparatus also includes the plurality of heat transfer devices to accomplish the required comfort conditioning, namely the preheating coil 13, the chemical humidity control unit 14, the first sensible cooling coil 15, the second sensible cooling coil 16, the upper radiant panel 17, the lower radiant panel 18, and the perimeter panel 19.

Chilled water from the first water chiller 118 is circulated by the pump 20 through the line 21 to the second convective coil 16, then through the line 22 to the lower radiant panel 18, through the perimeter panel 19, through the line 23 to the chemical dehumidifier 14, and from thence through the line 24 back to the first water chiller 118.

Chilled water from the second water chiller 119 is circulated by a pump 121 to a line 122 and through a three-way valve 123 to a line 124 and through the pipes 28, which are in thermal contact with the upper radiant panel 17, from thence through a line 125 back to the second water chiller 119. An alternate circuit from the chiller 119, used when this chiller is not operating but when water from a tower coil 126 is used instead, proceeds through the pump 121, a valve 127, the cooling tower coil 126, the pump 33, and the line 34, to the first convective coil 15, and from thence through valve 98 to a line 128, the valve 123, the line 124, the pipes 28, the line 125, and back to the chiller 119. The chemical dehumidifying unit 14 is connected in parallel, relative to coolant, with the first convective coil 15 and the pipes 28 by means of a supply line 129 from the line 34 and the return line 51 to the line 125.

The cooling tower coil 87 is in a circuit which is circulated by the pump 35. Under summer conditions, warm water from the condenser 120 flows through the lines 40 and 41, the three-way valve 43, the line 44, the line 45, the three-way valve 46, the line 47, the lines 48 and 49, the valve 69, and the cooling coil 87, where heat is dissipated to the atmosphere, and from thence through the three-way valve 70 and the pump 35 back to the condenser 120.

Under winter day cycle the water flows through the three-way valve 43, the line 64, the pump 65, the line 66, the preheat coil 13, the line 67, the line 45, the three-way valve 46, the line 71, the pump 72, the converter 73, and from thence either through the valve 80 to the line 48, or through the line 75, the valve 76, the line 22, a three-way valve 130, a line 131, and the perimeter panel 19, to the line 23, and from thence through the valve 78 and the line 79 to the lines 48 and 49 for return to the condenser 120, the lines 40 and 41 and the valve 43.

Outside air is drawn through the duct 52 and proceeds through the same ducts and components as in FIGURE 1.

For summer operation of the system of FIGURE 2, the controls set forth below may be followed. The dampers 91 through 96 are positioned and controlled as discussed in connection with FIGURE 1. The sensor 100 maintains 62° F. discharge air temperature and the valves 98 and 99 respond to control the flow of water through the convective cooling coils 15 and 16. The dampers 94 and 96 are positioned to allow relief of the minimum outside air. The damper 95 is closed.

The three-way valve 43 is set to by-pass the preheating coil 13 by directing water from the line 41 to the line 44, and the three-way valve 46 is set to direct water from the line 45 to the line 47. Both valves are positioned by the sensor 102. The valve 69 is open and the three-way valve 70 passes water from the coil 87, in which heat is dissipated, to the pump 35.

The valve 76 is closed so that condenser water is not allowed to mix with the chilled water coming from the chiller 118 through the second convective coil 16. The valves 106 and 11 are modulated by the controller 107 to control the amount of water directed through the lower radiant panel 18 and the perimeter panel 19. The valve 78 is closed, whereas the valve 77 is open for return water to flow through the line 23 to the dehumidifier 14 and thence to the chiller 118. The valve 130 passes water from the line 22 to the lower panel 18, or through the line 131, bypassing the panel 18, when the temperature in the space 32 is below a predetermined minimum. The valve 130 can be controlled by a temperature sensor and controller (not illustrated) which is responsive to temperature within the space. The heat absorbed in the lower panel 18 and in the perimeter panel 19 is removed in the chiller 118 and eventually dissipated in the tower coil 87.

The second chiller 119 is not operating and the water in this circuit is circulated by the pump 33 through the line 34, through the convective coil 15, the line 128, the valve 123, and the line 124 to the pipes 28, where the heat absorbed by the upper panel 17 is carried off by the water. From the pipes 28, the water flows through the line 125, the chiller 119, the pump 121, and the valve 127 to the tower coil 126 where the heat is dissipated to the atmosphere.

Under the winter day cycle, all dampers are in the same positions as for summer cycle, but the three-way valve 43 now passes water from the line 41 to the line 64, and the pump 65 circulates the water through the line 66, the preheat coil 13, the line 67, the line 45, the three-way valve 46, and the line 71, to the pump 72. From the pump 72, the water flows to the converter 73, which reheats the water if necessary, and then through the line 75, the valve 76, which is now open, and the line 22. The water in the line 22 bypasses the lower panel 18 by going through the valve 130 to the line 131, and is used to heat the perimeter panel 19 before returning through the line 23, the valve 78, and the line 79 to the line 48. The valve 69 is closed and the valve 70 passes water from the line 49 to the pump 35. The valves 77 and 111 are now closed and the first chiller 118 is not operating.

It is possible that, during winter day operation in a multi-zone building, heating may be required in the building perimeter zones, while cooling is required in the interior. With this system, the heat removed from the upper and lower panels of the interior zone may be redistributed to the perimeter zone in a manner similar to that described below. In the single zone depicted in FIG. 2, during the winter day cycle, the chiller 119 pumps heat from the upper radiant panel 17, into the circuit described above, which heats the perimeter panel 19. This is accomplished by closing the valve 127 and setting the valve 123 to pass water from the line 122 to the line 124. As a consequence, the heat captured by the upper panel 17 is pumped to the condenser 120, and redistributed therefrom to the perimeter panel 19. Convective coils 15 and 16 are not operated during the winter day cycle.

Under the winter night cycle, assuming that the lights 30 are off, the heat pumped to the perimeter panel 19 is now taken from outside the building. The outside air dampers 91, 92, 93, 95, 96 are all closed, and damper 94 is open. Thus air is 100% recirculated. The chiller 118 and its associated circuit are not operating. The coil 126 becomes the heat source utilized by the heat pump chiller 119. Water flows in the closed circuit composed of the pump 33, the line 34, the line 129, the line 105, the valve 110, the line 51, the line 125, the chiller 119, the pump 121, the valve 127, and the tower coil 126. The condenser circuit redistributes the heat to the perimeter panel 19 in the same manner as during the winter day cycle, except that no heat is lost in the preheat coil 13 because the damper 91 is closed.

For conditions intermediate winter and summer, the apparatus of FIG. 2 is operated as follows. The valves 43 and 46 remain in the "winter" position to operate the preheat coil 13, and the damper 91 is open to admit the minimum outside air required. The damper 93 is closed and the damper 92 is open to bypass the humidity control unit 14. The dampers 94, 95 and 96 are modulated to maintain a temperature of 62° F. for the air mixture in the duct 56. The coils 15 and 16 are not operated. The valve 69 is open and the valve 70 positioned as in summer operation in order that excess heat from the condenser 120, not used in the preheating coil 13, can be dissipated in the cooling tower coil 87. The valve 78 is closed, while the valves 77 and 106 are open. The valves 76 and 111 are modulated so that either cooling or heating is done by the lower panel 18, whichever is necessary depending on inside space requirements. The heat generated by the lights 30 and the associated ballast 31 is dissipated to the atmosphere in the coil 126 as in the summer plan of operation.

Figure 3:
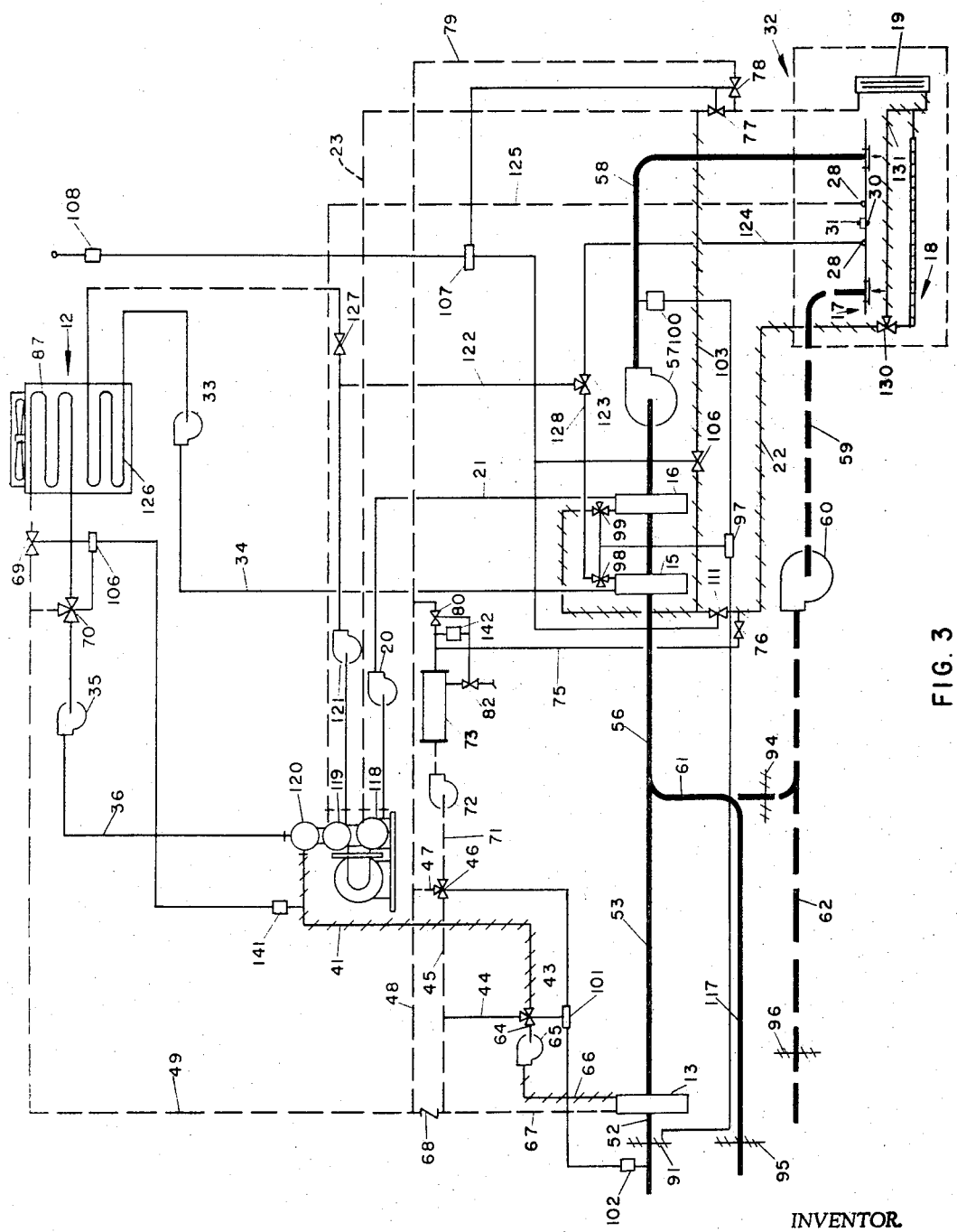
FIG. 3 is a partially schematic flow diagram of still further modified apparatus according to the invention.

Referring to FIG. 3, the apparatus is similar to that which is illustrated in FIG. 2, except that the dehumidification of the air is done by the sensible cooling coils 15 and 16, and therefore, the humidifying or dehumidifying apparatus and its associated lines, valves and the like have been omitted. Some of the by-pass ducting and a damper are also unnecessary, and have been omitted.

All controls and operations for summer, winter day, winter night, and intermediate cycles are unchanged from those used in the apparatus of FIG. 2, with the exception of apparatus which has been omitted.

Figure 4:
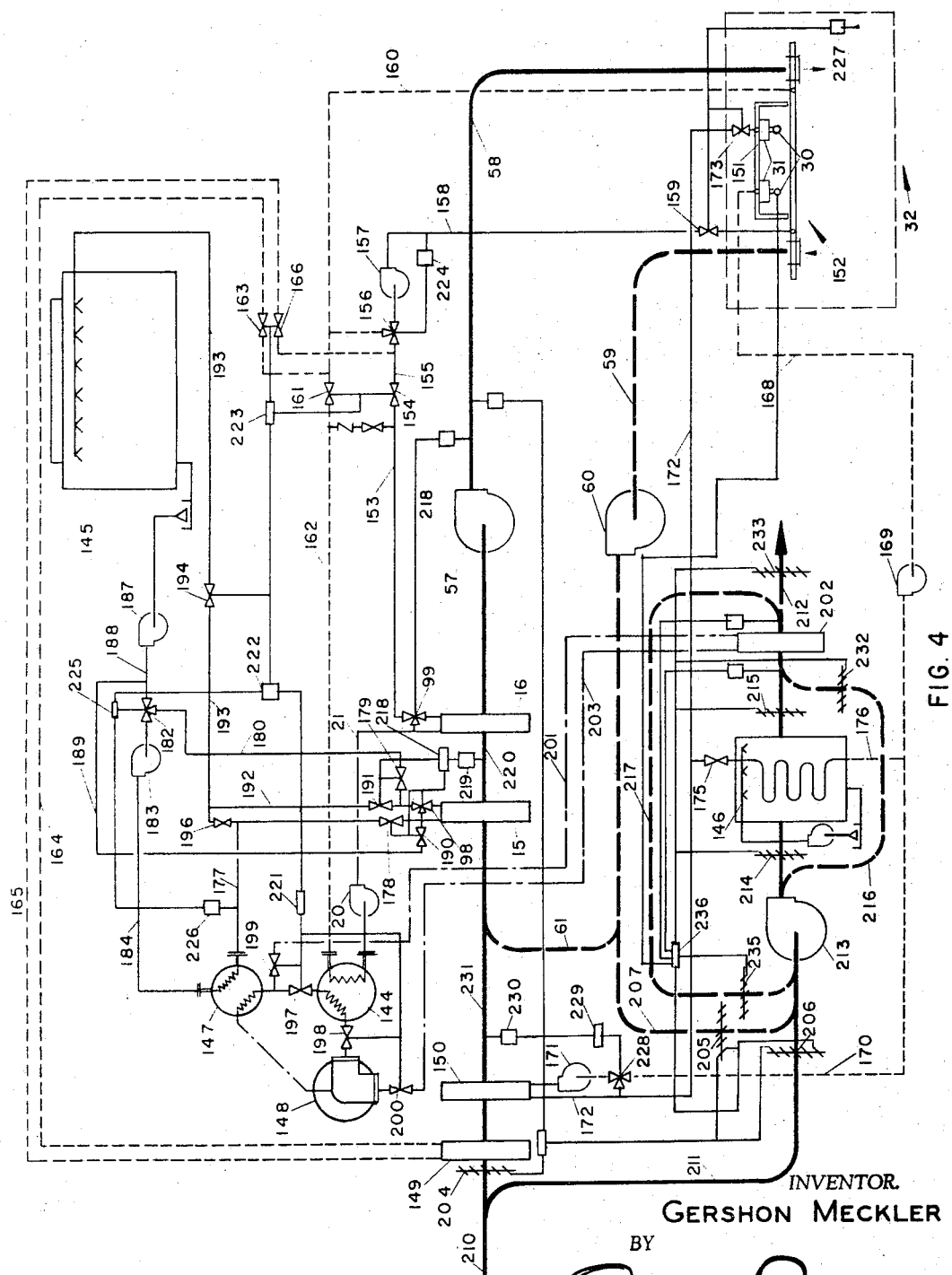
FIG. 4 is a partially schematic flow diagram of another apparatus according to the invention.

Referring to FIG. 4, apparatus according to the invention, in a further embodiment, comprises a water chiller 144, an open circuit cooling tower 145, and a closed circuit evaporative cooler or heat exchanger 146 having water sprays 146a, as sources for cooled water as a heat transfer medium. The water chiller 144 is combined with a condenser 147 and a compressor 148 to form a conventional refrigeration unit. The apparatus also includes a plurality of heat transfer devices to accomplish the required comfort conditioning, namely preheating coils 149 and 150, the first sensible cooling coil 15, the second sensible cooling coil 16, an upper radiant troffer 151, and a lower radiant louver and panel 152.

Under conditions of summer operation, chilled water from the chiller 144 is circulated by the pump 20 through the line 21 to the second convective coil 16, then through the three-way valve 99, a line 153, a valve 154, a line 155, a three-way valve 156, a pump 157, a line 158, and a valve 159 to the lower panel and louver 152. From the lower panel and louver 152 the water is circulated back to the chiller 144 through a line 160, a valve 161 and a line 162.

Under conditions of winter operation, the heat removed from the lower panel and louver 152 is utilized in the preheat coil 149. This is achieved by closing the valves 154 and 161 to allow the water from the lower panel and louver to pass through a valve 163 and a line 164 to the preheat coil 149 and thence through a line 165 and a valve 166 to the line 155 for recirculation through the lower panel and louver 152.

The heat captured by the upper radiant troffer 151 is utilized in the coil 150 during winter operation to preheat the outside intake air by circulating water from the upper troffer 151 through a line 168, a pump 169, a line 170 and a pump 171 to the coil 150. The water returns to the upper troffer through a line 172 and a valve 173. During summer operation, a valve 175 in a line 176 through the evaporative cooler 146 is open and water flows through a coil 176a in the evaporative cooler 146. Heat captured in the upper troffer 151 is then removed indirectly from the water by the air and water vapor in the cooler 146, which makes use of the low wet bulb temperature of exit or exhaust air.

During winter operation warm water from the condenser 147 is circulated through a line 177, a valve 178 to the first convective coil 15, then through the three-way valve 98, a valve 179, a line 180, a three-way valve 182, a pump 183, and a line 184 back to condenser 147. In this manner heat from the condenser is used to heat the supply air.

Under conditions of summer operation, the valves 178 and 179 are closed and water from the cooling tower 145 is circulated by a pump 187 through a line 188, a line 189, a valve 190 to the sensible cooling coil 15, then through the three-way valve 98, a valve 191, a line 192, and a line 193 back to the cooling tower 145. A valve 194 is provided in the line 193. During this summer cycle the warm water from condenser 147 is passed through a valve 196 to the line 193 and heat from the condenser is rejected in the cooling tower.

The refrigerant cycle is as follows: During summer operation, valves 197 and 198 are open and valves 199 and 200 are closed. The refrigerant therefore circulates from the chiller 144 to the compressor 148, to the condenser 147 and back to the chiller. During winter operation, the valves 197 and 198 are closed and the valves 199 and 200 are open. The refrigerant circulates from the condenser 147, through the valve 199, a line 201, a coil 202, and a line 203, to the compressor 148 and back to the condenser 147.

Air in the system is recirculated relative to the space 32 by the supply blower 57 and by the exhaust blower 60, moving through the supply duct 58 and into the space 32, and from the space through the exhaust duct 59, and then through the cross duct 61. Dampers 204, 205 and 206 can be closed to occasion the maximum system recirculation. By opening or modulating the dampers 204 and 205 air can be completely or partially taken from and exhausted to the atmosphere via ducts 207, 210 and 212 to provide fresh air ventilation as required.

Relief air is either blown by a blower 213 through the evaporative cooler 146 by opening dampers 214 and 215 or caused to by-pass the evaporative cooler through a duct 216. A duct 217 is available for recirculation of the air through the evaporative cooler and coil 202. The purpose of this recirculation of relief air is explained later in connection with an explanation of the mechanical operations and controls of the system.

To achieve the operation outlined for summer day, the mechanical operations and controls set forth below may be followed:

The valve 99 is modulated by a temperature sensor and controller 218 to maintain a predetermined air temperature in the duct 58.

The valves 190 and 191 are normally open during summer day operation, while the valves 178 and 179 are normally closed. The valve 98 is modulated, e.g., by a control mechanism 218 which is actuated by a temperature sensor 219, to maintain a predetermined air temperature in a duct 220.

The valves 197, 198, 199 and 200 are set by a control mechanism 221 which is actuated by a manual, two-position, summer-winter switch 222. In the summer position, the valves 197 and 198 are open and the valves 199 and 200 are closed.

The valves 154, 161, 163 and 166 are set by a control mechanism 223 which is actuated by the manual switch 222. The valves 154 and 161 are open and the valves 163 and 166 are closed during summer day operation. The valve 194 is also set by the manual switch 222, and is open during summer day operation. The valve 156 is modulated by a temperature sensor and controller 224 to maintain a predetermined water temperature in line 158.

The three-way valve 182 is set by a control mechanism 225, which is actuated during the summer by temperature sensor 226, to maintain a water temperature of 95° F. in the line 177. The valves 159 and 173 are controlled by a temperature sensor and controller 227 to maintain a comfortable condition in the space 32. A valve 228 in the line 170 is modulated by a control mechanism 229 which is actuated by a temperature sensor 230 in a duct 231 which receives air from the pre-heat coil 150 and delivers air to the coil 15. The valve 228 is opened to provide pre-heating of the air delivered to the duct 231, as required.

During summer day operation the damper 206 and a damper 232 in the bypass duct 216 are closed, while the dampers 204, 205, 214 and 215 and a damper 233 in the vent duct 212 are open. A damper 235 in the recirculation duct 217 is adjusted to maintain a constant air volume through the blower 213.

The valve positions in FIG. 4 during summer night operation may remain unchanged from their respective summer day positions, but the refrigeration unit is now shut off. The dampers 204, 205 and 206 are now closed to provide 100% air recirculation. It is not necessary to change the positions of the other dampers during summer night operation.

For operation of the system under winter day conditions, the following mechanical operations may be followed:

The valves 190 and 191 are now closed and the valves 178 and 179 are open to make the coil 15 a heating coil utilizing the heat from the condenser 147. The valves 197 and 198 are closed and the valves 199 and 200 are open, so that refrigerant is circulated through the coil 202 as a source for heat which is re-distributed to the coil 15 as described above. The valves 154 and 161 are closed and the valves 163 and 166 are open to circulate the water from the louver and panel through the coil 149 so that heat captured in the louver and panel can be utilized to pre-heat outside air in the coil 149. The valve 194 is closed to make the cooling tower 145 inoperative. The three-way valve 182 is now set by the control mechanism 225 to pass water from the line 180 to the pump 183 in response to a signal from the manual switch 222.

During winter day operation, the dampers 206 and 232 are closed, while the dampers 204, 205, 214, 215 and 233 are open as in summer day operation.

During winter night operation the respective valve settings remain the same as in winter day operation, but now the dampers 205, 214, 215 and 235 are closed, and the dampers 206, 232 and 233 are open so that the coil 202 can be used to extract heat from exhaust air. The colder air which results is rejected to the atmosphere. If frosting occurs on the tubes of the coil 202, a defrost cycle is actuated as follows: the dampers 205, 206, 232 and 233 are closed and the dampers 214, 215 and 235 are opened. The lights 30 are energized, and, with the ballasts 31, become a heat source for defrosting by the circulation of water from the troffer 151 to the evaporative cooler 146. No water is supplied to the cooler 146 during this cycle. The lights supply heat simultaneously to the space and for defrosting of the coil 202. The changes in operation for the defrost cycle can be made automatically, e.g., by a controller 236 which is responsive to a signal, such as an excessive pressure drop through the coil 202, indicating too low a temperature for the air vented from the duct 212.

Figure 5:
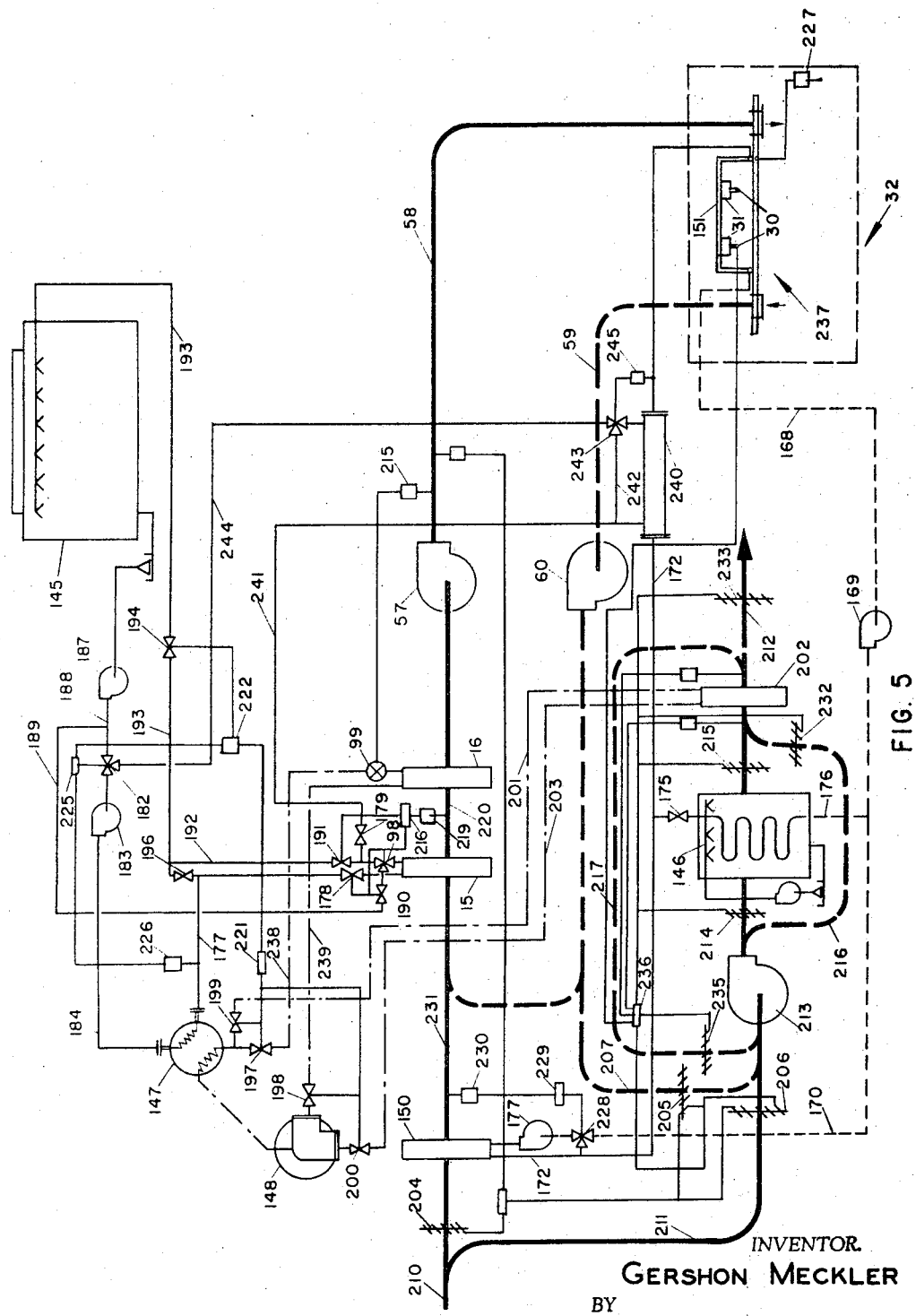
FIG. 5 is a partially schematic flow diagram of still another apparatus according to the invention.

Referring to FIG. 5, the apparatus is similar to that which is illustrated in FIG. 4, but with certain modifications. The air handling system and water circuit connected to the radiant troffer 151 are similar in layout and control to those of FIG. 4, but the chilled water circuit supplying the lower louver and panel 152, and the first pre-heat coil 149 and connecting lines of FIG. 4 have been omitted. Instead, an energy transfer device or lower louver and panel 237 in FIG. 5 is a thermoelectric apparatus of the type described in application Ser. No. 140,416 which was filed Sept. 25, 1961, entitled "Ceiling System." The details of the panel 237 will be discussed subsequently.

The refrigeration unit has no chiller, refrigerant being circulated during summer operation through the valve 197 and a line 238 to the second sensible cooling coil or energy transfer device 16, then through a line 239 to the valve 198 and through the compressor 148 and condenser 147.

A heat exchanger 240 is provided in the line 172, which supplies water for heat exchange with the radiant troffer 151 and also with the panel 237 to add heat to the water as may be necessary for a comfortable condition in the space 32 during winter operation. A first set of corresponding thermal junctions of the panel 237 is in thermal contact or heat exchange relationship with water from the line 172, and a second set is in heat exchange relationship with the space, through the panel.

Condenser water leaving the first convective coil 15 is supplied to the heat exchanger 240 through a line 241, and by-passes the exchanger 240 through a line 242, and a three-way valve 243, or is supplied to the exchanger for heating and then flows through the valve 243. In either case, water from the valve 243 is returned to the three-way valve 182 through a line 244, and flows through the pump 183 and the line 184 to the condenser 147. The three-way valve 243 is modulated by a temperature sensor and controller 245 to maintain a predetermined temperature in the line 172.

All controls and mechanical operations of the apparatus of FIG. 5 are the same as those of FIG. 4 during summer day and night and winter day and night operation except as indicated above, except for omissions and except that the temperature sensor 227 in the FIG. 5 apparatus controls the thermoelectric elements in the lower panel and louver to make it either a heat absorber or a heat generator relative to the space, and to the extent instantaneously required.

Referring to FIGS. 7–10, the louver and panel 237 is suspended below a cellular steel deck-panel 238 having concrete fills because it includes longitudinally extending cells 239 which form electrical raceways for carrying electrical wires and ducts for carrying air. Supporting structures 240, suspended by hanger rods 241, provide longitudinally extending ducts 242 for the transmission of the air to and from the space 32. The upper surface of the structure 240 have one or more openings (not shown) along the length thereof which open into one or more flexible ducts 243. The flexible ducts open into a supply or return header duct system which preferably are separate ducts 244.

Various arrangements for supplying the air to the enclosure and for returning the air can be provided. For example, the structures 240 can be alternately connected to the supply and return ducts 244 through their associated ducts 243. On the other hand, all of the ducts 242 on one side of the enclosure can be connected to and supplied with air from one of the ducts 244 through their associated ducts 243, while all the ducts 242 on the other side of the enclosure can be connected to and return air to the other return duct 244 through their associated ducts 243. Alternatively, as shown by the dotted lines, the ducts 243 can be connected to cells 239, some of which can be employed to supply the air to the enclosure and others of which can be employed to return the air. The duct 242 has diffusers 245 at the bottom openings for diffusing the air.

The water from the cooler 146 is circulated through passages 246 and 247 in the bottom portion of the supporting structure 240. The water is supplied from a supply header conduit 248 and returned to a return conduit 249 by vertical conduits 250 and 251.

A heat conductor or troffer 252 has downwardly curved ends which are mounted on the supporting structures 240 and are located above flat-type fluorescent tubes 253. The tubes 253 are above a louvered light diffuser comprising a plurality of spaced, parallel bars 254 and 255 of heat conductive material. The bars and fluorescent tube are thermally insulated by insulators 256. Marginal portions of the tubes are thermally insulated from the adjacent structure by insulators 257. The ends of the heat conductors 252 and the bars 254 and 255 are in thermal contact with the bottom portion of the supporting structures 240.

Figure 10:
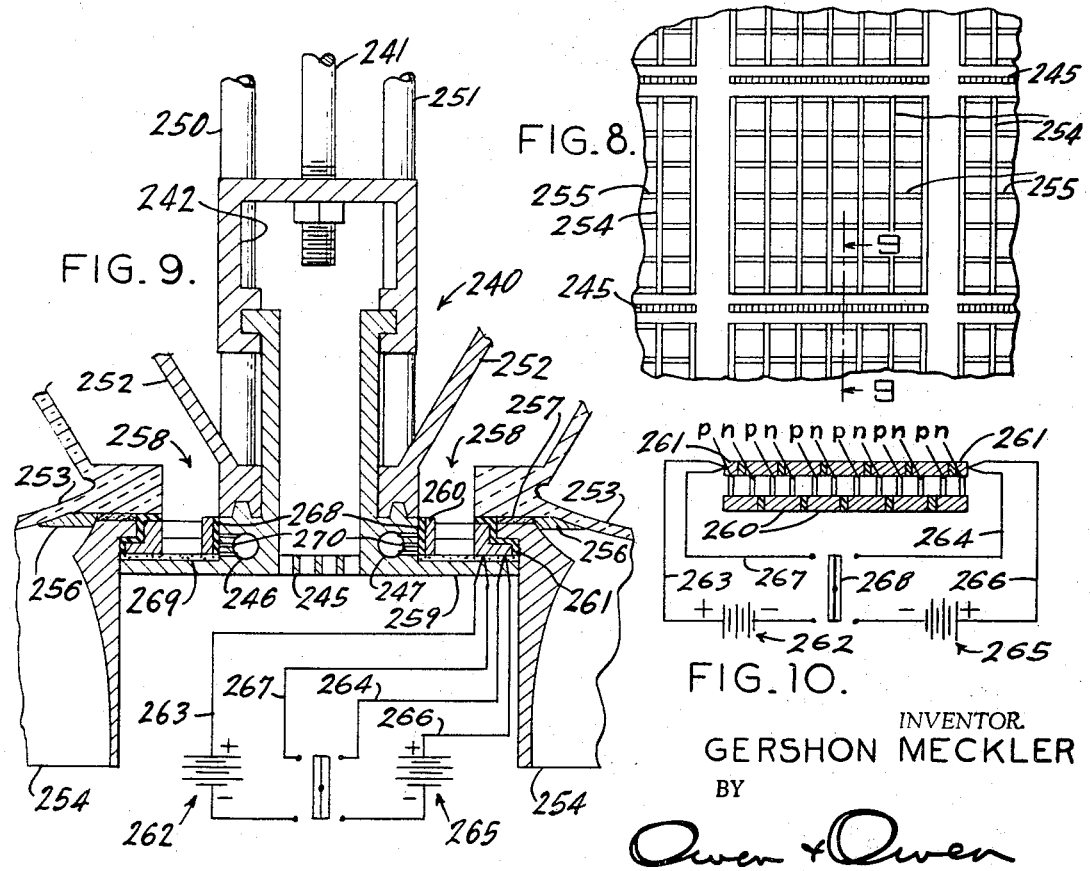
FIG. 10 is a diagrammatic view showing a portion of the electrical circuitry of the panel arrangement of FIG. 7.

A plurality of thermojunctions 258 are supported on outwardly directed flanges 259 between the passages 246, 247 and the adjacent bars 254. A group of the thermojunctions is shown in FIG. 10, and each thermojunction comprises p-type semiconductor elements connected to n-type semiconductor elements by electrically conducting plates 260 and 261. The p-type elements as well as n-type elements can be of $Bi_2Te_3$ or of PbTe, and while these elements have a figure of merit Z of 2 or 3 it is contemplated that elements having values for Z of 5 and even 7 may be used. However, the instant invention is not specifically concerned with the identity of the p- and n-type elements.

A current may be passed through the p- and n-type elements and the plates 260 and 261 from source 262 of direct current through lines 263 and 264 in a well-known manner to form cold junctions toward the plates 260 while hot junctions are formed in the side toward the plates 261 when it is desired to increase the temperature of the zone located below the panel 237. In this instance, the heat is transferred from the cooling water in the passage 247 to the louvered diffuser formed by the bars 254 and 255 even though this water cools the conductor 252 and the tube 253.

When it is desired to cool the zone below the panel 237 to a degree greater than that normally obtained from the water in the passages 246 and 247, a current is passed in the opposite direction from another source 265 of direct current through lines 266 and 267 by actuating a suitable switch 268 which forms cold junctions toward the plates 261 and hot junctions toward the plates 260. Heat is transmitted from the bars 254 and 255 to the water in the passages 246 and 247. The thermojunctions 258 are electrically insulated from both the louvered grid formed by the bars 254 and 255 and the bottom portion of the structure 240 by insulators 268. Likewise the thermojunctions 258 are electrically and thermally insulated from the flanges 259 by insulators 269. The transfer of heat from the plates 260 to the water in the passages 246 and 247 is aided by suitable fins 270.

In comparing the dynamically integrated comfort conditioning systems of FIGS. 1 through 5, various similarities and differences are observed. For simplification in the following discussion, the system of FIG. 1 will be referred to as System No. 1, the system of FIG. 2 will be referred to as System No. 2, etc.

Comparing in particular now the refrigerating units of each system, it can be seen that System No. 1 contains two separate units, each having a compressor, condenser and chiller; one suit is associated with the upper radiant panel and perimeter panel whereas the other unit is associated with the lower radiant panel. System No. 2 and System No. 3 have only one refrigerating unit, but they are each comprised of two chillers with a common compressor and a common condenser. This may be referred to as a two-stage chiller because each of the two chillers is operated at a different temperature. In System No. 2 and System No. 3 the two chillers may be operated simultaneously or separately. System No. 4 also has a single refrigeration unit, but it is comprised of a single chiller, compressor and condenser. Through a switching arrangement in System No. 4, the chiller may be replaced as a heat absorber by a coil which absorbs heat from the relief air. Contrary to System No. 2 and System No. 3, the chiller and heat absorbing coil cannot be operated simultaneously in System No. 4. In System No. 5, expansion of a refrigerant in the coil 16, as required, or in the coil 202, eliminates the need for a water chiller in the refrigerating unit, and makes one of the coils 16 and 202 a heat absorber. The two coils are operated alternately depending on the season.

Comparing the actual conditioned space of each system, it is observed that in Systems No. 1, No. 2 and No. 3, the upper radiant panel, lower radiant panel and perimeter panel can either be used as heat absorbers or as heat sources relative to the conditioned space. In System No. 4 the radiant troffer and lower panel and louver can only be used as heat absorbers. In System No. 4 only the lights and associated ballasts can be relied upon as heat sources. System No. 5 is unique in its use of thermoelectric elements to make the lower panel and louver either a heat source or a heat absorber as required. In all of the systems it is understood that the air circulated to the space is either a heat absorber or heat source depending on the season. In all of the systems except Nos. 4 and 5, a perimeter panel is provided to absorb heat at the outside walls of the building before it penetrates far into the conditioned space, and such a panel can be employed in Systems Nos. 4 and 5. In System No. 1, the perimeter panel is in series with the upper radiant panel, and in Systems Nos. 2 and 3, it is in series with the lower radiant panel, or circulated water can by-pass the lower radiant panel and flow directly to the perimeter panel.

The treatment of the supply air to the space in the systems differs in that Systems Nos. 1 and 2 use two-stage chemical methods of dehumidification; whereas Systems Nos. 3, 4 and 5 use mechanical dehumidification. However, chemical dehumidification can be used in Systems Nos. 4 and 5. The dehumidification units are not shown in detail in the figures.

In Systems Nos. 1, 2 and 3 a closed circuit cooling tower is used as a mechanism of rejection of heat from the condenser water during seasons when this heat is not redistributed to the space, e.g., summer cycle. In the same systems, a second coil in the closed circuit cooling tower is used to reject heat from the higher temperature circuit of the two-stage water cooling circuit. Systems Nos. 4 and 5 reject the heat from the higher temperature circuit in an evaporative cooler which takes advantage of the low wet bulb temperature condition of the relief air from the space. Systems Nos. 4 and 5 also use an open circuit cooling tower to reject heat from the condenser water if it is not being redistributed to the space.

An analysis of the systems of this invention in regard to sources and sinks of heat, during the seasons of operation, shows that in System No. 1, during summer operation, the lower panel 18 and the second convective coil 16 are effective heat sources with the chiller 10 as a heat sink. In the same system the upper panel 17 and the perimeter panel 19 are heat sources with the second chiller 11 as a heat sink. The heat delivered to the two chillers is removed from the condensers 38 and 39 as heat sources with the cooling tower coil 87 as a sink. The first convective coil 15 is a heat source with the cooling tower coil 126 as the corresponding heat sink.

During winter operation of System No. 1, the cooling tower coil 87 becomes a heat source with the chiller 11 as a sink, and that heat is redistributed from the condenser 39 as a source to the preheat coil 13 as a sink. Any excess heat over that required by the coil 13 is distributed to the lower panel 18 or to the heat exchanger 82 as a sink. Additional heat, if necessary, may be obtained from the heat exchanger 73 as a source. The heat exchanger 82 becomes a source of heat for redistribution to the perimeter panel 19 and to the upper panel 17 as sinks.

During the summer operation of Systems Nos. 2 and 3, the upper panel 17 and the first convective coil 15 are effective heat sources with the cooling tower coil 126 as a sink. The lower panel 18, the perimeter panel 19 and the second convective coil 16 are heat sources in series connection with the chiller 118 as the corresponding heat sink. The heat absorbed by the chiller 118 is released from the condenser 120 as a source to the cooling tower coil 87 as a heat sink.

Under winter conditions of operation, the upper panel 17 is a heat source with the chiller 119 as its sink, and this heat is released by the condenser 120 as a source for redistribution to the preheat coil 13, the lower panel 18 and the perimeter panel 19 as sinks. Additional heat for redistribution can be obtained from the heat exchanger 73 as a source if it is required for comfort conditioning of the space 32.

The lower panel and louver 152 of System No. 4, during summer operation, and the coil 16, are heat sources for the chiller 144 as a sink. The heat absorbed in the chiller 144 is then released by the condenser 147 as a source and rejected in the cooling tower 145 as a sink. The coil 15 operates as a heat source with the cooling tower 145 directly as a sink. The radiant troffer 151 is a heat source using the evaporative cooler 146 as a sink.

During winter operation heat absorbed in the radiant troffer 151 is redistributed to the preheat coil 150 as a sink, and heat absorbed in the lower panel and louver 152 is redistributed to the preheat coil 149 as a sink. The air coil 202 is a source of heat for the condenser 147. This heat is redistributed to the coil 15 as a sink.

In System No. 5 the coil 16 is a direct source of heat to the condenser 147 during summer operation and the chiller section of the refrigeration unit is removed altogether. The heat from the condenser 147 is rejected in the cooling tower 145 as a sink. The convective coil 15 also rejects its absorbed heat to the cooling tower 145 as a sink. In this system, the radiant troffer 151 and the lower panel and louver 237 are both sources of heat with the evaporative cooler 146 as a sink.

During winter operation the air coil 202 is the source of heat for the condenser 147, and this heat is redistributed to the coil 15 and to the heat exchanger 240 as sinks. The heat exchanger 240 is a source of heat for the lower panel and louver 237 and for the preheat coil 150 as sinks.

The foregoing analyses, which cover only conditions of summer and winter day operation of the several systems, are summarized in tabular form, below:

FIGURE 1

| Heat sources | Heat sinks |
|---|---|
| Summer: | |
| Lower panel 18 and coil 16 | Chiller 10. |
| Upper panel 17 and perimeter panel 19. | Chiller 11. |
| Condensers 38 and 39 | Cooling tower coil 87. |
| Coil 15 | Cooling tower coil 126. |
| Winter: | |
| Cooling tower coil 87 | Chiller 11. |
| Condenser 39 | Preheat coil 13. |
| Heat exchanger 73 | Lower panel 18. |
| Do | Heat exchanger 82. |
| Heat exchanger 82 | Upper panel 17 and perimeter panel 19. |

FIGURE 2 AND FIGURE 3

| Heat sources | Heat sinks |
|---|---|
| Summer: | |
| Upper radiant panel 17 | Cooling tower coil 126. |
| Coil 15 | Do. |
| Lower radiant panel 18 and perimeter panel 19 and coil 16. | Chiller 118. |
| Condenser 120 | Cooling tower coil 87. |
| Winter: | |
| Upper radiant panel 17 | Chiller 119. |
| Condenser 120 | Preheat coil 13. |
| Heat exchanger 73 | Lower radiant panel 18 and perimeter panel 19. |

FIGURE 4

| Heat sources | Heat sinks |
|---|---|
| Summer: | |
| Lower panel and louver 152 | Chiller 144. |
| Coil 16 | Do. |
| Radiant troffer 151 | Evaporative cooler 146. |
| Coil 15 | Cooling tower 145. |
| Condenser 147 | Do. |
| Winter: | |
| Lower panel and louver 152 | Preheat coil 149. |
| Radiant troffer 151 | Preheat coil 150. |
| Air coil 202 | Condenser 147. |
| Condenser 147 | Coil 15. |

FIGURE 5

| Heat sources | Heat sinks |
|---|---|
| Summer: | |
| Lower radiant panel 237 and upper troffer 151. | Evaporative cooler 146. |
| Coil 16 | Condenser 147. |
| Coil 15 and condenser 147 | Cooling tower 145. |
| Winter: | |
| Air coil 202 | Condenser 147. |
| Condenser 147 | Coil 15 and heat exchanger 240. |
| Heat exchanger 240 | Lower radiant panel 237 and preheat coil 150. |

The following analysis of space load, used on a typical building, can be applied to any building. The instantaneous load in typical air conditioned spaces is generated by some combination of sun, lighting, people, transmission through walls and/or roof and glass, ventilation air, appliances, business and other machinery, etc. A significant portion of the sensible load from these load sources appears as radiant heat.

The increase in the entropy ($\Delta S$) $T_r$ of the building cooling system associated with the transfer of load ($Q_1$, $Q_2$) from individual sources (lights, people, equipment, etc.) at any corresponding exchange temperature levels ($T_1$, $T_2$) can be mathematically related at any temperature level ($T_1$) assigned for heat rejection by the following equations:

$$(\Delta S)T_r = +\frac{Q_r}{T_r} + \sum_{i=1}^{i=n} \frac{Q_i}{T_i} \quad (4)$$

where $$Q_r = \sum_{i=1}^{i=n} Q_i \quad (5)$$

Referring to Equations 4 and 5, the increase in system entropy of a building cooling system can be reduced by increasing the exchange temperature levels ($T_1$, $T_2$) at which load is removed from individual sources. Notice that as the exchange temperature levels approach the temperature level assigned for heat rejection, the increase in entropy approaches zero.

The following typical example illustrates the practical significance of evaluating the increase in entropy for comparable systems design. The example shows the installed refrigeration tonnage required for each of the following systems:

(1) A conventional all-air system.
(2) An air-water system applying the apparatus of FIG. 3 with mechanical dehumidification.
(3) An air-water system applying the apparatus of FIG. 2 with chemical dehumidification, for a building with 16,237 square feet of conditioned area with the following load requirements:

B.t.u. hr.
(1) Maximum sensible coincident load (including occupants, lighting, transmission and solar) _____ 605,413
(2) Total internal latent load _____ 95,000
(3) Ventilation air load:
    (a) sensible load _____ 90,157
    (b) latent load _____ 116,807

The distribution of load using the integrated water-cooled lighting system is given below:

B.t.u. hr.
(1) By air system _____ 298,608
(2) By tower cooled water circuit _____ 165,557
(3) By chilled water circuit _____ 152,263

The tonnage required using the conventional all-air system:

B.t.u. hr.
(1) Maximum sensible coincident cooling load _____ 605,413
(2) Total internal latent load _____ 95,000
(3) Ventilation air load:
    (a) sensible load _____ 90,157
    (b) latent load _____ 116,807

[1] 907,377

[1] 75.6 tons.

The tonnage required using an air-water system applying the apparatus of FIG. 3 with mechanical dehumidification:

B.t.u. hr.
(1) Maximum sensible coincident cooling load _____ 605,413
(2) Load removed by tower circuit (no refrigeration required) _____ −165,557
(3) Total internal latent load _____ 95,000
(4) Ventilation air load:
    (a) sensible load _____ 90,157
    (b) latent load _____ 116,807

[1] 741,820

[1] 61.8 tons.

Percent savings in installed refrigeration tonnage:

$$\frac{75.6 - 61.8}{75.6} \times 100 = 18.3\%$$

The tonnage required using an air-water system applying the apparatus of FIG. 2 with chemical dehumidification:

B.t.u. hr.
(1) Maximum sensing coincident cooling load _____ 605,413
(2) Load removed by tower circuit (no refrigeration required) _____ −165,557
(3) Total internal latent load _____ 95,000
(4) Ventilation air load:
    (a) sensible load _____ 90,157
    (No latent load)

[1] 530,013

[1] 44.2 tons.

Percent savings in installed refrigeration tonnage:

$$\frac{75.6-41.2}{75.6} \times 100 = 41.6\%$$

The foregoing examples are for illustration and are not intended to limit the disclosure, capacity, or results of the systems as the conditions of the space, climate, equipment, and use are variable factors always having important effects on result.

It will be understood that various changes and modifications can be made from the specific details which are set forth in FIGS. 1 through 5, as discussed above. For example, the systems of FIGS. 1 through 3 can be operated without using the chemical humidity control unit 14, in which case, during summer operation, mechanical dehumidification is accomplished by the coil 15, by the coil 16, or by both. Similarly, in buildings having relatively small percentages of exterior of glass surfaces, the perimeter panels 19 of FIGS. 1 through 3 may not be required. Also, the direct evaporation of a refrigerant in the coil 16, as shown in FIG. 5, can be utilized in the apparatus of any one of FIGS. 1 through 4, or the use of chilled water as a heat absorber in the coil 16, as shown in FIGS. 1 through 4, can be utilized in the system of FIG. 5.

Figure 6:
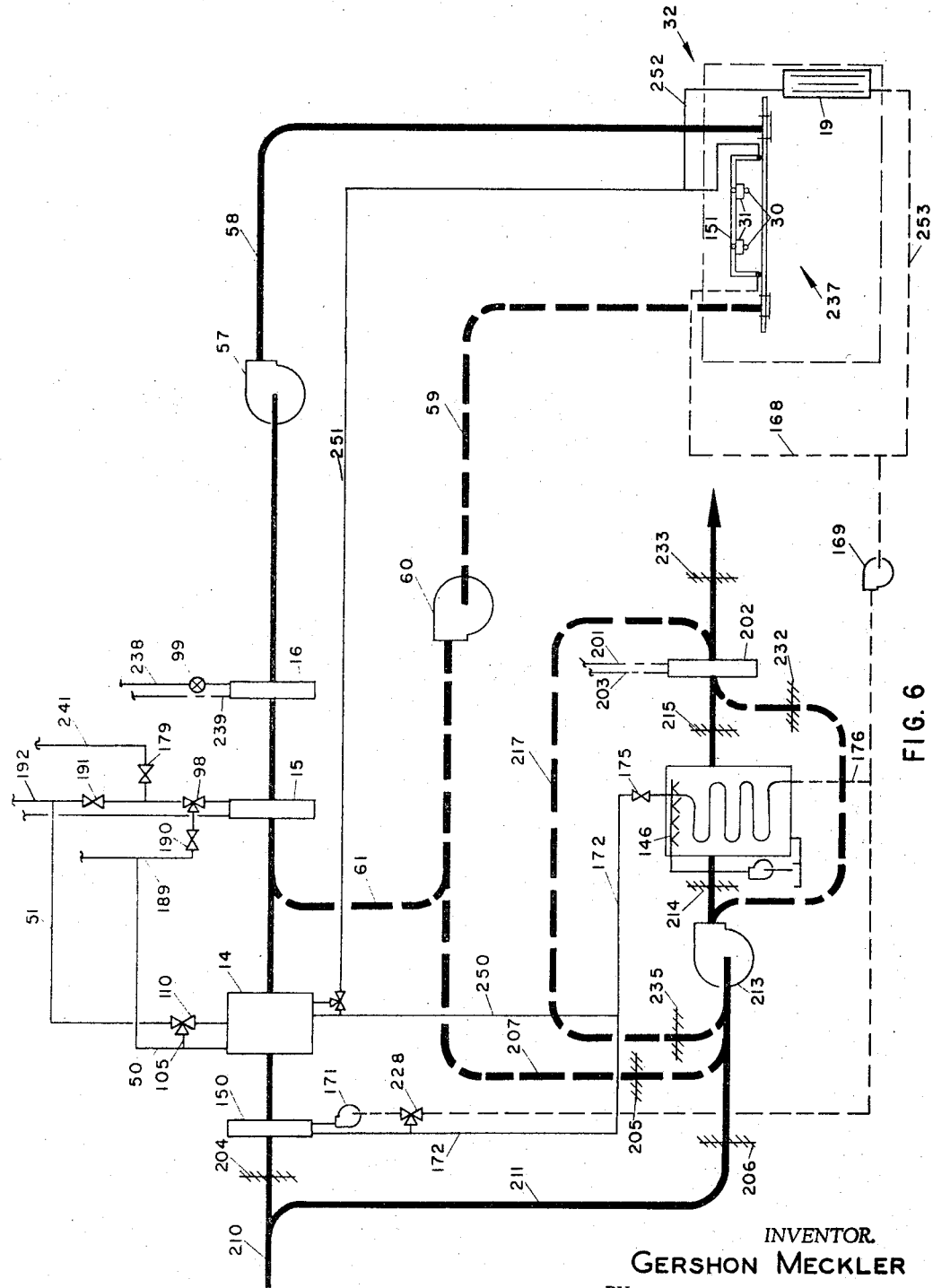
FIG. 6 is a fragmentary partially schematic flow diagram of yet another apparatus according to the invention.
Figure 7:
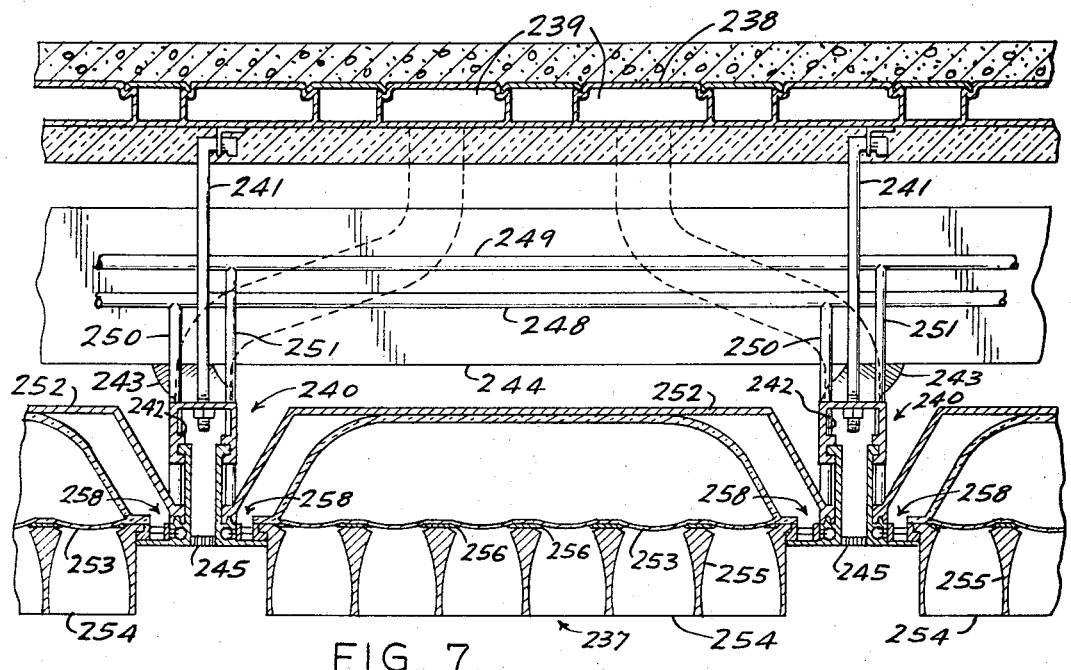
FIG. 7 is a view in vertical cross section of a heat transfer panel arrangement used with the system of FIG. 5.
Figure 9:
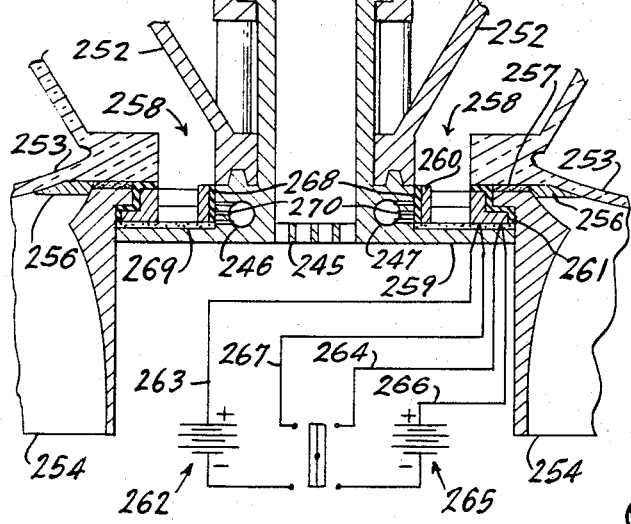
FIG. 9 is a cross-sectional view taken along the line 9—9 of FIG. 8.
Figure 8:
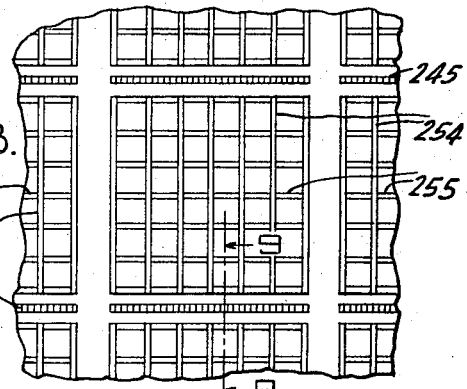
FIG. 8 is a schematic view showing the grid-like pattern of the heat transfer panel of FIG. 7, as viewed from below.

Certain modifications which can be made to the apparatus of either FIG. 4 or FIG. 5, and which are advantageous under certain conditions of operation, are shown in FIG. 6. The apparatus includes, as heat transfer devices, the chemical humidifier or dehumidifier 14 and the perimeter panel 19 and associated piping of FIGS. 1 and 2, and, in addition, all of the devices of FIG. 5, i.e., the preheating coil 150, the coils 15 and 16, the troffer 151, the thermoelectric panel 237, the evaporative cooler 146, and the coil 202. The air circulation system of FIG. 6 is identical with that of FIG. 5, as are the cooling tower (not illustrated), the compressor (not illustrated), the condenser (not illustrated) and the circuits (not illustrated) through which chilled water and refrigerant are circulated to the portions of the circuits which are shown in FIG. 6.

Chilled water is supplied to the first stage of the chemical humidifier or dehumidifier 14 as in the FIG. 1 apparatus, the line 50 being connected to the line 189 through which water is supplied to the first coil 15, and the return line 51 being connected to the return line 192 from the coil 15. Chilled water is supplied to the second stage of the humidifier or dehumidifier 14 from the evaporative cooler 146 through a line 250, which is connected to the line 172, and returns therefrom through a line 251 to the troffer 151. A line 252 is also provided to deliver water from the line 251 to the perimeter panel 19, as well as a line 253 through which water is returned from the perimeter panel 19 to the line 168.

Summer operation of the apparatus of FIG. 6 is identical with that of the apparatus of FIG. 5 except for that of the humidifier or dehumidifier 14 and the perimeter panel 19. Chilled water is supplied to the first stage of the unit 14 as described above in connection with FIGS. 1 and 2. Water from the evaporative cooler 146 is supplied to the second stage of the unit 14 through the valve 175, the line 172, and the line 250, and is controlled as previously described in connection with FIGS. 1 and 2. Return water from the humidification unit 14 flows through the line 251, and, in parallel through the troffer 151 and the perimeter panel 19. By-pass lines (not illustrated) around the troffer 151 and the panel 19 and three-way valves (not illustrated) can be provided, for modulation to maintain, for example, a constant temperature at the discharge of the troffer 151 and of the panel 19. Water returns to the evaporative cooler 146 from the troffer 151 and from the panel 19 through the lines 253 and 168, respectively.

Winter operation of the apparatus of FIG. 6 is identical with that previously described for FIG. 5, since both the humidity control unit 14 and the perimeter panel 19 would ordinarily be by-passed. In some instances, however, particularly in a large building, it is frequently advantageous to circulate water from the line 251 through at least some of the perimeter panel 19, for example those which are in perimeter portions of the building which are instantaneously subject to excessive heat losses without corresponding heat gains.

The apparatus of FIG. 6 can also be modified by elimination of the perimeter panels 19, in whole or in part, by substitution for the thermoelectric panel 237 of a lower radiant panel 18 or 152 of FIGS. 1 through 4, or in both ways. Similarly, chilled water can be used in the coil 16. Various other changes and modifications of the apparatus of FIG. 6, as well as of that of FIGS. 1 through 5, will be apparent to one skilled in the art, and can be made without departing from the spirit and scope of the invention as defined in the appended claims.

What I claim is:

1. Apparatus for comfort conditioning of an inhabited closed space within a building in which at least one source of radiant energy is situated, said apparatus comprising at least three separate energy transfer devices, a first of said devices being effective to absorb radiant energy from at least one of the sources for radiant energy, a second of said devices being effective to reduce, by convective heat transfer, the sensible heat of air circulated in contact therewith and a third of said devices being effective to absorb radiant energy from the closed space, means for circulating air through the second of said devices and then into the closed space, evaporative cooling means, means for withdrawing air from the closed space, means for circulating at least a part of the withdrawn air through said evaporative cooling means, means for spraying water into withdrawn air within said evaporative cooling means for evaporation and consequent sensible cooling, means for venting circulated air and water vapor from said evaporative cooling means, transferring means for absorbing energy from the first, the second and the third of said transfer devices, said transferring means including means for circulating a heat transfer fluid in heat exchange relationship with said first device, and means effective to transfer energy absorbed by said transferring means to air and vapor vented from said evaporative cooling means, said last-named means including indirect heat exchange means effective to receive heat transfer fluid from said circulating means, to effect heat exchange between such fluid and air that has been sensibly cooled within said evaporative cooling means, and to return the fluid, after heat exchange, to said circulating means for further heat exchange with said first device.

2. Apparatus for comfort conditioning of an inhabited closed space within a building in which at least one source of radiant energy is situated, said apparatus comprising at least three separate energy transfer devices, a first of said devices being effective to absorb radiant energy from at least one of the sources for radiant energy, a second of said devices being effective to reduce, by convective heat transfer, the sensible heat of air circulated in contact therewith and a third of said devices being a panel which, when cooled, is effective to absorb radiant energy from the closed space, and, when heated, is effective to transfer heat to the space, means including a plurality of thermoelectric elements and an electric circuit for energizing said elements so that cold junctions thereof are in thermal contact with said panel, means for energizing said thermoelectric elements in said circuit with direct current, means for circulating air through the second of said devices and then into the closed space, evaporative cooling means, means for withdrawing air from the closed space, means for circulating at least a part of the withdrawn air through said evaporative cooling means, means for venting circulated air from said evaporative cooling means, transferring means for absorbing energy from the first, the second and the third of said transfer devices, said transferring means including means for circulating a heat exchange fluid in thermal contact with hot junctions of said thermoelectric elements in said circuit, and means effective to transfer energy absorbed by said transferring means to air and vapor vented from said evaporative cooling means, said last-named means including indirect heat exchange means effective to receive transfer fluid from said circulating means, to effect heat exchange between such fluid and air that has been sensibly cooled within said evaporative cooling means, and to return the fluid, after heat exchange, to said circulating means for further circulation in thermal contact with hot junctions of said thermoelectric elements in said circuit.

3. Apparatus for comfort conditioning by supplying heat to a habitable closed space within a building in which at least one normally de-energized source of radiant energy is situated, said apparatus comprising at least four separate energy transfer devices, a first of said devices being effective to absorb radiant energy from at least one of the sources for radiant energy, and the second, the third and the fourth of said devices being effective to affect, by convective heat transfer, the sensible heat of air circulated in contact therewith, means for withdrawing air from the closed space, and for circulating the withdrawn air through the second of said devices and back to the space, means for circulating air in a closed circuit through the third and the fourth and back to the third of said devices, means for circulating ambient air through the fourth of said devices and for venting the circulated ambient air, first air circulation control means normally effective to prevent the circulation of air in the closed circuit through the third and the fourth of said devices, second air circulation control means effective to prevent, but normally enabling, the circulation of ambient air through the fourth of said devices and the venting thereof, transferring means for effecting heat transfer with the first, the second, the third, and the fourth of said transfer devices, said transferring means including normally inoperative means for circulating a heat transfer fluid in a first closed circuit in heat exchange relationship with said first device, then in heat exchange relationship with said third device, and back into heat exchange relationship with the first of said devices, said transferring means also including means for circulating a heat transfer fluid at a low temperature level and in a second closed circuit through the fourth of said devices, and means for circulating a heat transfer fluid at a higher temperature level and in a third closed circuit through the second of said devices, means effective to pump heat from the fluid in the second, closed, heat transfer fluid circuit to the fluid in the third, closed, heat transfer fluid circuit, and control means effective, in response to a signal indicating that the temperature of circulated ambient air vented after heat exchange with the fourth of said devices is below a predetermined control point, to actuate said second air circulation control means to prevent the circulation of ambient air through the fourth of said devices, to actuate said first air circulation control means to enable the closed circuit circulation of air through the third and the fourth of said devices, to energize the source of radiant energy within the building, and to cause circulation of the heat transfer fluid in the first closed circuit.

4. Apparatus for comfort conditioning of an inhabited closed space, said apparatus comprising at least two separate energy transfer devices, a first of said devices being a chemical dehumidifier effective to reduce the latent heat of air circulated in contact therewith, a second of said devices being effective to reduce, by convective heat transfer, the sensible heat of air circulating in contact therewith, means for circulating air through the first and the second of said devices and then into the closed space, evaporative cooling means, means for withdrawing air from the closed space, means for circulating at least a part of the withdrawn air through said evaporative cooling means, means for venting circulated air from said evaporative cooling means, transferring means for absorbing energy from the first and the second of said transfer devices, and means effective to transfer energy absorbed by said transferring means to air and vapor vented from said evaporative cooling means.

5. Apparatus for comfort conditioning of an inhabited closed space, said apparatus comprising at least two separate energy transfer devices, a first of said devices being a chemical dehumidifier effective to reduce the latent heat of air circulated in contact therewith, a second of said devices being effective to reduce, by convective heat transfer, the sensible heat of air circulated in contact therewith, means for circulating air through the first and the second of said devices and then into the closed space, evaporative cooling means, means for withdrawing air from the closed space, means for circulating at least a part of the withdrawn air through said evaporative cooling means, means for venting circulated air from said evaporative cooling means, transferring means for absorbing energy from the first of said transfer devices, and for transferring such energy to air and vapor vented from said evaporative cooling means, and transferring means for absorbing energy from the second of said devices.

6. Apparatus for comfort conditioning of an inhabited closed space, said apparatus comprising at least two separate energy transfer devices, a first of said devices being a chemical dehumidifier effective to reduce the latent heat of air circulated in contact therewith, a second of said devices being effective to reduce, by convective heat transfer, the sensible heat of air circulated in contact therewith, means for circulating air through the first and the second of said devices and then into the closed space, evaporative cooling means, means for withdrawing air from the closed space, means for circulating at least a part of the withdrawn air through said evaporative cooling means, means for venting circulated air from said evaporative cooling means, transferring means for absorbing energy from the first of said transfer devices at a low temperature level and for transferring such energy to air and vapor vented from said evaporative cooling means, second transferring means for absorbing energy from the first of said devices at a temperature higher than the low level, and transferring means for absorbing energy from the second of said devices.

7. Apparatus for maintaining the temperature of a closed space within a building at a generally predetermined temperature and in which at least one artificial light source is situated which gives off heat at a temperature appreciably above said predetermined temperature, said apparatus comprising: a first heat transfer means positioned generally adjacent said light source for absorbing heat from said light source at a first temperature level above said predetermined temperature, air flow means for circulating air to said closed space, second heat transfer means for controlling sensible heat of air discharged from said air flow means, a radiant panel in said closed space for removing radiant heat from said closed space at a temperature below said predetermined temperature, heat absorbing means for absorbing heat at a temperature below said predetermined temperature, a first heat transfer system for transferring heat from said second heat transfer means to said heat absorbing means to maintain said second heat transfer means at a temperature level appreciably below said predetermined temperature, a second heat transfer system for rejecting heat from said first heat transfer means to a heat sink at a temperature level above that of said first heat transfer system, and means for transferring heat from said radiant panel to one of said first and second heat transfer systems, and effective to maintain said radiant panel at a temperature intermediate that of said first and second heat transfer means.

8. The apparatus of claim 7 wherein said second heat transfer system includes a sensible heat transfer coil, and wherein the apparatus includes means effective to transfer heat from said sensible heat transfer coil to air outside of said building.

9. The apparatus of claim 8 wherein said means effective to transfer heat from said sensible heat transfer coil is a cooling tower.

10. The apparatus of claim 8 wherein said sensible heat transfer coil is an evaporative cooler through which air discharged from said closed space passes.

11. Apparatus for maintaining the temperature of a closed space within a building at a generally predetermined temperature and in which at least one artificial light source is situated which gives off heat at a temperature appreciably above said predetermined temperature, said apparatus comprising: a first heat transfer means positioned generally adjacent said light source for absorbing heat from said light source at a first temperature level above said predetermined temperature, air flow means for circulating air to said closed space, second heat transfer means for controlling sensible heat of air discharged from said air flow means, a radiant panel in said closed space for removing radiant heat from said closed space at a temperature below said predetermined temperature, refrigeration means having condenser means for rejecting heat therefrom and heat absorbing means for absorbing heat at a temperature below said predetermined temperature, a first heat transfer system for transferring heat from said second heat transfer means to said heat absorbing means to maintain said second heat transfer means at a temperature level appreciably below said predetermined temperature, a second heat transfer system for rejecting heat from said first heat transfer means to a heat sink at a temperature level above that of said first heat transfer system, means for transferring heat from said radiant panel to one of said first and second heat transfer systems and effective to maintain said radiant panel at a temperature intermediate that of said first and second heat transfer means, a heating coil in said air flow means, a heat transfer system operative to transfer heat from said condenser to said heating coil, and means for causing said first heat transfer system to bypass said second heat transfer device and transfer heat from said radiant panel back to said heat absorbing means of said refrigeration means.

12. The apparatus of claim 7 including: a radiant wall panel adjacent an outside wall of said building air space for supplying heat to offset radiant losses through said means for transferring heat from said radiant wall panel to said second heat transfer system and then to said heat sink.

13. The apparatus of claim 7 including: a radiant wall panel adjacent an outside wall of said building air space for absorbing energy transmitted through said wall, and means for transferring heat from said radiant wall panel to said first heat transfer system.

14. The apparatus of claim 7 including: a radiant wall panel adjacent an outside wall of said building air space for suplying heat to offset radiant losses through said wall, and means for transferring heat from said first heat transfer means to said radiant wall panel.

15. The apparatus of claim 14 wherein said heat sink is a refrigerant evaporator operated at a temperature higher than said heat absorbing means, said refrigerant evaporator supplying heat to a refrigerant condenser which in turn supplies heat to said radiant wall panel.

16. The apparatus of claim 12 wherein said heat sink is a refrigerant evaporator operated at a higher temperature than said heat absorbing means cooling said second device.

17. The apparatus of claim 7 including: a radiant wall panel adjacent an outside wall of said building air space for absorbing energy transmitted through said wall, and means for circulating heat absorbing fluid from said second device through said radiant panel, then through said wall panel and back to said heat absorbing means.

18. Apparatus for maintaining at a generally predetermined temperature a closed space within a building in which is situated at least one artificial light source which gives off heat at a temperature appreciably above said predetermined temperature, said apparatus comprising: first heat transfer means positioned generally adjacent said light source for absorbing heat from said light source at a first temperature level above said predetermined temperature, air flow means for circulating tempered air to said closed space, second heat transfer means for controlling the sensible heat of air flowing through said air flow means, a radiant ceiling panel in said closed space positioned beneath said light source for removing radiant heat from said closed space, a radiant wall panel for absorbing energy transmitted through a wall of said enclosed space, a first refrigeration machine having a condenser and an evaporator, a second refrigeration machine having a condenser and an evaporator, said second refrigeration machine having a higher evaporator temperature than said first refrigeration machine, a first heat transfer system for sequentially transferring heat from said second heat transfer means to said radiant ceiling panel and then to said evaporator of said first refrigeration machine, and a second heat transfer system for sequentially transferring heat from said wall panel to said first heat transfer means and on to said evaporator of said second refrigeration machine.

19. Apparatus for maintaining at a generally predetermined temperature a closed space within a building in which is situated at least one artificial light source which gives off heat at a temperature appreciably above said predetermined temperature, said apparatus comprising: first heat transfer means positioned generally adjacent said light source for absorbing heat from said light source at a first temperature level above said predetermined temperature, air flow means for circulating tempered air to said closed space, second heat transfer means for controlling sensible heat of air flowing through said air flow means, a radiant ceiling panel in said closed space positioned beneath said light source for removing radiant heat from said closed space, a radiant wall panel for absorbing energy transmitted through a wall of said enclosed space, a refrigeration machine having a compressor, a condenser, and first and second coolers through which refrigerant from said condenser flows, said second cooler being operated at a temperature level higher than said first cooler, a first heat transfer system for transferring heat from said first heat transfer means to said second cooler, and a second heat transfer system for absorbing heat from said second heat transfer means and then from said ceiling panel and said wall panel and transferring the heat to said first cooler.

20. Apparatus for maintaining a space within a building at a generally predetermined temperature above ambient conditions to compensate for heat losses through external surfaces of the building, said apparatus comprising: artificial light sources which give off heat at a temperature above said predetermined temperature, first panel means positioned generally adjacent said artificial light sources for absorbing heat from said artificial light sources at a first temperature level above said predetermined temperature, perimeter panel means in the space for heating the space by direct heat transfer thereto, and a heat transfer system for transferring heat from said first panel means to a heat transfer liquid and means effective to circulate the heat transfer liquid from said first panel to said perimeter panel and into heat transfer relationship therewith.

21. Apparatus for maintaining a building at a generally predetermined temperature above ambient conditions to compensate for heat losses through external surfaces of the building, said apparatus comprising: artificial light sources which give off heat at a temperature appreciably above said predetermined temperature, first panel means positioned generally adjacent said artificial light sources for absorbing heat from said artificial light sources at a first temperature level above said predetermined temperature, perimeter panel means in said building for heating space within said building, a heat transfer system for transferring heat from said first panel means to a heat transfer liquid and means effective to circulate the heat transfer liquid from said first panel to said perimeter panel and into heat transfer relationship therewith, air flow means for withdrawing air from said building, heat absorbing means for removing heat from air flowing through said air flow means, and means including a heat pump effective to transfer heat from said heat absorbing means to a space within the building.

22. Apparatus for maintaining a building at a generally predetermined temperature above ambient conditions to compensate for heat losses through external surfaces of the building, said apparatus comprising: artificial light sources which give off heat at a temperature appreciably above said predetermined temperature, first panel means positioned generally adjacent said artificial light sources for absorbing heat from said artificial light sources at a first temperature level above said predetermined temperature, perimeter panel means in said building for heating a space within said building, a first heat transfer system for transferring heat from said first panel means to a heat transfer liquid and means effective to circulate the heat transfer liquid from said first panel to said perimeter panel and into heat transfer relationship therewith, first air flow means for circulating air to a space within the building, heat transfer means for heating air circulated by said air flow means, second air flow means for withdrawing air from said building, heat absorbing means for removing heat from air flowing through said second air flow means, and means including a heat pump effective to transfer heat from said heat absorbing means to said heat transfer means.

23. Apparatus for maintaining a building at a generally predetermined temperature above ambient conditions to compensate for heat losses through external surfaces of the building, said apparatus comprising: artificial light sources which give off heat at a temperature appreciably above said predetermined temperature, first panel means positioned generally adjacent said artificial light sources for absorbing heat from said artificial light sources at a first temperature level above said predetermined temperature, perimeter panel means in said building for heating the space within said building, and means including a heat pump and effective to absorb heat from said first panel means and to discharge heat at a higher temperature to said perimeter panel means, whereby said perimeter panel means transfers heat absorbed from said first panel means to space within said building.

24. Apparatus for maintaining a building at a generally predetermined temperature above ambient conditions to compensate for heat losses through external surfaces of the building, said apparatus comprising: artificial light sources which give off heat at a temperature appreciably above said predetermined temperature, first panel means positioned generally adjacent said artificial light sources for absorbing heat from said artificial light sources at a first temperature level above said predetermined temperature, second panel means in said building for heating a space within said building, means including a first heat pump and effective to absorb heat from said first panel means and to discharge heat at a higher temperature to said second panel means whereby said second panel means transfers heat absorbed from said first panel means to space within said building, first air flow means for circulating air to a space within the building, heat transfer means for heating air circulated by said air flow means, second air flow means for withdrawing air from said building, heat absorbing means for removing heat from air flowing through said second air flow means, and means including a heat pump effective to transfer heat from said heat absorbing means to said heat transfer means.

25. Apparatus for maintaining a building at a generally predetermined temperature above ambient conditions to compensate for heat losses through external surfaces of the building, said apparatus comprising: artificial light sources which give off heat at a temperature appreciably above said predetermined temperature, first panel means positioned generally adjacent said artificial light sources for absorbing heat from said artificial light sources at a first temperature level above said predetermined temperature, second panel means in said building for heating a space within said building, means including a thermoelectric circuit effective to pump heat from said first panel means to said second panel means, a first air flow means for circulating air to a space within the building, heat transfer means for heating air circulated by said air flow means, second air flow means for withdrawing air from said building, heat absorbing means for removing heat from air flowing through said second air flow means, and means including a heat pump effective to transfer heat from said heat absorbing means to said heat transfer means.

26. In a lighting and air conditioning system for an enclosed space: perimeter panel means within the space for absorbing solar energy and positioned for direct heat transfer with the space, a light source within said building, a heat transfer fluid-filled cooling means mounted adjacent said light source for removing heat from said light source, a cooling fluid supply system in said building for supplying non-refrigerated heat transfer fluid in series to said cooling means and then to said perimeter panel and a conditioned air supply system effective to introduce air into said enclosed space.

27. Apparatus for comfort conditioning of an inhabited closed space within a building in which at least one source of radiant energy is situated, said apparatus comprising at least three separate energy transfer devices, a first of said devices being effective to absorb radiant energy from at least one of the sources for radiant energy, a second of said devices being effective to reduce, by convective heat transfer, the sensible heat of air circulated in contact therewith, and a third of said devices being a panel at the outer perimeter of said closed space and effective to absorb radiant energy, means for circulating air through the second of said devices and then into the closed space, evaporative cooling means, means for circulating air to said evaporative cooling means, means for spraying water into the air within said evaporative cooling means for evaporation and consequent sensible cooling, means for venting air and water vapor from said evaporative cooling means, transferring means for absorbing energy from the first, the second and the third of said transfer devices, said transferring means including means for circulating a heat transfer fluid in heat exchange relationship with said first device, and means effective to transfer energy absorbed by said transferring means to air and vapor of said evaporative cooling means, said last-named means including indirect heat exchange means effective to receive heat transfer fluid from said circulating means, to effect heat exchange between such fluid and air that has been sensibly cooled within said evaporative cooling means, and to return the fluid, after heat exchange, to said circulating means for further heat exchange with said first device.

28. Apparatus for comfort conditioning of an inhabited closed space within a building in which at least one source of radiant energy is situated, said apparatus comprising at least three separate energy transfer devices, a first of said devices being effective to absorb radiant energy from at least one of the sources for radiant energy, a second of said devices being effective to reduce, by convective heat transfer, the sensible heat of air circulated in contact therewith and a third of said devices being a panel positioned for heat transfer with said closed space, which, when cooled, is effective to absorb radiant energy from the closed space, and, when heated, is effective to transfer heat to the space, means including a plurality of thermoelectric elements and an electric circuit for energizing said elements so that cold junctions thereof are in thermal contact with said panel, means for energizing said thermoelectric elements in said circuit with direct current, means for circulating air through the second of said devices and then into the closed space, evaporative cooling means, means for circulating air to said evaporative cooling means, means for venting circulated air and vapor from said evaporative cooling means, and transferring means for absorbing energy from the first, the second and the third of said transfer devices, said transferring means including (a) means for circulating a heat exchange fluid in thermal contact with hot junctions of said thermoelectric elements in said circuit and (b) means effective to transfer energy absorbed by said transferring means to air and vapor of said evaporative cooling means, said last-named means including indirect heat exchange means effective to receive transfer fluid from said circulating means, to effect heat exchange between such fluid and air that has been sensibly cooled within said evaporative cooling means, and to return the fluid, after heat exchange, to said circulating means for further circulation in thermal contact with hot junctions of said thermoelectric elements in said circuit.

29. Apparatus for maintaining a space within a building at a generally predetermined temperature above ambient conditions to compensate for heat losses through external surfaces of the building, said apparatus comprising: artificial light sources which give off heat at a temperature above said predetermined temperature, first panel means positioned generally adjacent said artificial light sources for absorbing heat from said artificial light sources at a first temperature level above said predetermined temperature, perimeter panel means in the space, for heating the space by direct heat transfer thereto, a supplemental heat source, means for circulating a heat-transfer fluid in heat exchange relationship with said perimeter panel means, and means for transferring heat absorbed by said first panel means and from said supplemental source to said heat-exchange fluid circulated to said perimeter panel means.

30. In a lighting and air conditioning system for an enclosed space: perimeter panel means for absorbing solar energy, a light source within said space, a fluid-filled cooling means mounted adjacent said light source for removing heat therefrom, means including a chemical dehumidifier for supplying conditioned air to said space, a cooling fluid supply system in said building for supplying a non-refrigerated heat transfer fluid to said dehumidifier and to said cooling means and for circulating fluid from said cooling means adjacent said light source to said perimeter panel means, cooling panel means positioned for radiant heat transfer within said space, and means for removing heat from said cooling panel means to enable cooling of said space thereby.

31. In a lighting and air conditioning system for an enclosed space: perimeter panel means within the space for absorbing solar energy and positioned for direct heat transfer with the space, a light source within said space, heat transfer fluid-filled cooling means mounted adjacent said light source for removing heat from said light source, a cooling fluid supply system for supplying non-refrigerated heat transfer fluid to said cooling means and for circulating fluid from said cooling means to said perimeter panel means, panel means positioned for radiant heat transfer with said space, means for removing heat from said panel means to enable cooling of said space thereby, and a conditioned air supply system effective to introduce air into said enclosed space.

32. In a lighting and air conditioning system for an enclosed space: a light source within said space, heat transfer fluid-filled cooling means mounted adjacent said light source for removing heat from said light source, a cooling fluid supply system for supplying non-refrigerated heat transfer fluid to said cooling means, panel means positioned for radiant heat transfer with said space, means for removing heat from said panel means to enable cooling of said space thereby, and a conditioned air supply system effective to introduce air into said enclosed space.

33. In an air conditioning system for an enclosed space: perimeter panel means within the space for absorbing solar energy and positioned for direct heat transfer with the space, a light source within said space, a cooling fluid supply system for supplying non-refrigerated heat transfer fluid to said perimeter panel means, a cooling panel positioned for radiant heat transfer with said space, means for removing heat from said cooling panel to enable cooling of said space thereby, and a conditioned air supply system effective to introduce air into said enclosed space.

34. In a lighting and air conditioning system for an enclosed space within a building: a light source within said building, heat transfer fluid-filled cooling means mounted adjacent said light source for removing heat from said light source, means including a chemical dehumidifier for supplying conditioned air to said space, a cooling fluid supply system in said building for supplying non-refrigerated heat transfer fluid to said cooling means and to said chemical dehumidifier, a cooling panel positioned for radiant heat transfer with said space, and means for removing heat from said cooling panel to enable cooling of said space thereby.

35. In an air conditioning system for an enclosed space: perimeter panel means within the space for absorbing solar energy and positioned for direct heat transfer with the space, a cooling fluid supply system in said building for supplying non-refrigerated heat transfer fluid to said perimeter panel means, a cooling panel positioned for radiant heat transfer with said space, and means for removing heat from said cooling panel to enable cooling of said space thereby.

36. In a lighting and air conditioning system for an enclosed space: perimeter panel means within the space for absorbing solar energy and positioned for direct heat transfer with the space, a light source within said space, heat transfer fluid-filled cooling means mounted adjacent said light source for removing heat from said light source, a cooling fluid supply system in said building for supplying non-refrigerated heat transfer fluid to said cooling means and to said perimeter panel means, additional panel means positioned for radiant heat transfer with said space, and means for removing heat from said additional panel means to enable cooling of said space thereby.

37. Apparatus for comfort conditioning of a closed space within a building in which at least one source of radiant energy is situated, said apparatus comprising at least three separate energy transfer devices, a first of said devices being effective to absorb radiant energy from at least one of the sources for radiant energy, a second of said devices being effective to reduce the sensible heat of air circulated in contact therewith, and a third of said devices being a panel at the perimeter of said closed space and effective to absorb radiant energy, means for circulating air through the second of said devices and then into said closed space, heat-exchange means, means for circulating air to said heat-exchange means, means for venting air from said heat-exchange means, cooling means for absorbing energy from the first, the second and the third of said energy transfer devices, said cooling means including means for circulating a heat transfer fluid in heat exchange relationship with said first device and means effective to transfer energy absorbed by said cooling means to the air associated with said heat-exchange means, said last-named means including means effective to receive heat transfer fluid from said cooling means to effect indirect heat exchange between such fluid and air circulated through said heat-exchange means, and to return the fluid to said cooling means for further heat exchange with said first device.

38. Apparatus for comfort conditioning of a closed space within a building in which at least one source of radiant energy is situated, said apparatus comprising at least three separate energy transfer devices, a first of said devices being effective to absorb radiant energy from at least one of the sources for radiant energy, a second of said devices being effective for sensible heat exchange with air circulated in contact therewith and a third of said devices being a panel which, when cooled, is effective to absorb radiant energy from the closed space, and, when heated, is effective to transfer heat to the space, means including a plurality of thermoelectric elements and a power source for said elements, a first set of corresponding junctions thereof being in thermal contact with said panel, means for circulating air through the second of said devices and then into said closed space, heat exchange means, means for circulating air to said heat exchange means, means for venting circulated air from said heat exchange means, and circulating means for heat exchange with the first, the second and the third of said transfer devices, said circulating means including (a) means for supplying a heat exchange fluid in thermal contact with a second set of corresponding junctions of said thermoelectric elements and (b) means effective to transfer energy absorbed by said heat exchange fluid to the air associated with said heat exchange means, said last-named means including means effective to receive the heat exchange fluid from said circulating means, to effect indirect heat exchange between such fluid and air circulated through said heat exchange means and to return said fluid to said circulating means for further circulation in thermal contact with the second set of corresponding junctions of said thermoelectric elements in said circuit.

39. Apparatus for maintaining at a desired temperature a closed space which is within a building and in which at least one heat source is situated which gives off heat at a temperature appreciably above said desired temperature, said apparatus comprising: air flow means for circulating air to said closed space, a first heat transfer means effective to remove sensible heat from air discharged from said air flow means, a heat sink effective to absorb heat, a first heat transfer system for circulating a heat transfer fluid to said first heat transfer means from said heat sink to maintain said first heat transfer means at a generally predetermined low temperature, a second heat transfer means positioned generally adjacent said heat source for absorbing heat from said heat source at a temperature level above said predetermined temperature, a radiant panel in said closed space for removing radiant heat from said closed space at a temperature above said predetermined temperature, second heat transfer systems effective to circulate parallel streams of heat transfer fluid (a) to said second heat transfer means at a temperature level above the predetermined low temperature, and (b) to said radiant panel at a temperature level above the predetermined low temperature, said first and second heat transfer systems including means effective to transfer heat absorbed from said first heat transfer means, from said second heat transfer means and from said radiant panel to said heat sink.

References Cited

UNITED STATES PATENTS

| | | | |
|---|---|---|---|
| 1,905,811 | 4/1933 | Culver | 62—259 |
| 2,030,032 | 2/1936 | Keyes | 62—305 |
| 2,071,178 | 2/1937 | Roessler | 62—510 |
| 2,212,356 | 8/1940 | Shure | 62—305 |
| 2,242,588 | 5/1941 | McGrath | 62—175 |
| 2,257,485 | 9/1941 | Sewell | 62—180 |
| 2,453,433 | 11/1948 | Hansen | 62—259 |
| 2,768,509 | 10/1956 | Bateman | 62—160 |
| 2,971,350 | 2/1961 | Mills | 62—272 |
| 2,984,458 | 5/1961 | McFarlan | 62—305 |
| 3,009,331 | 11/1961 | Hewett | 62—176 |
| 3,064,440 | 11/1962 | Waller | 62—259 |
| 3,112,890 | 12/1963 | Snelling | 62—119 |
| 3,126,498 | 3/1964 | Bendell | 62—3 |

FOREIGN PATENTS 273,897   7/1951   Switzerland.

ROBERT A. O'LEARY, *Primary Examiner.*

CHARLES SUKALO, *Assistant Examiner.*